(12) United States Patent
Vari

(10) Patent No.: US 6,871,576 B2
(45) Date of Patent: Mar. 29, 2005

(54) HYDRAULIC ISOLATION VALVE

(76) Inventor: Peter Vari, 33 Lenape Rd., Richboro, PA (US) 18954

(*) Notice: Subject to any disclaimer, the term of this patent is extended or adjusted under 35 U.S.C. 154(b) by 0 days.

(21) Appl. No.: 10/369,400

(22) Filed: Feb. 19, 2003

(65) Prior Publication Data

US 2004/0159356 A1 Aug. 19, 2004

(51) Int. Cl.[7] ............................................. F15B 13/02
(52) U.S. Cl. ..................... 91/471; 91/445; 137/15.21; 137/596; 137/599.11; 137/864; 137/865; 137/884; 137/887
(58) Field of Search ..................... 137/15.21, 596, 137/599.11, 864, 865, 884, 887; 91/445, 471

(56) References Cited

U.S. PATENT DOCUMENTS

| | | |
|---|---|---|
| 3,572,366 A | 3/1971 | Wiggins |
| 3,589,387 A | 6/1971 | Raymond |
| 3,709,248 A | 1/1973 | Aurich et al. |
| 3,848,626 A | 11/1974 | Smith et al. |
| 4,215,721 A | 8/1980 | Hetherington et al. |
| 4,281,683 A | 8/1981 | Hetherington et al. |
| 4,351,327 A | 9/1982 | Rinne et al. |
| 4,848,391 A | 7/1989 | Miller et al. |
| 5,927,337 A | 7/1999 | LaMantia |
| 6,036,107 A | 3/2000 | Aspen et al. |
| 6,058,975 A | 5/2000 | Hui-Chen |
| 6,237,634 B1 | 5/2001 | Narita et al. |
| 6,293,305 B1 | 9/2001 | Soares |

FOREIGN PATENT DOCUMENTS

FR          2145858        1/1973

OTHER PUBLICATIONS

Fluid Power, Inc., Hyrdaulic, Pneumatic, Lubrication—Components & Systems Advertising Literature.
Rötelmann GmbH, "Rötelmann Shut–off and Control Technology. A Line of Ball Valves and Ideas".

Primary Examiner—Gerald A. Michalsky
(74) Attorney, Agent, or Firm—Volpe and Koenig, P.C.

(57) ABSTRACT

Method and apparatus for isolating hydraulic devices in a stacked hydraulic circuit of modular design employing an isolator valve module which enables partial and/or complete isolation of components in a hydraulic system to be isolated for inspection, testing, maintenance or replacement, by selective operation of the isolator valves in the isolator valve module. The isolator valve module may be a sub-plate module supporting other modules or a plurality of stacks of modules or may be a "sandwich" type module sandwiched between a sub-plate and another module or between two sandwich-type modules.

55 Claims, 26 Drawing Sheets

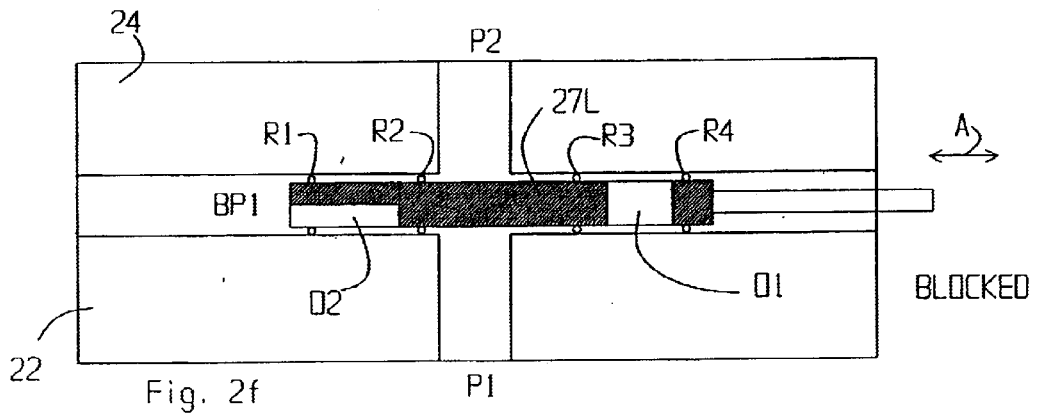
Fig. 2f — BLOCKED
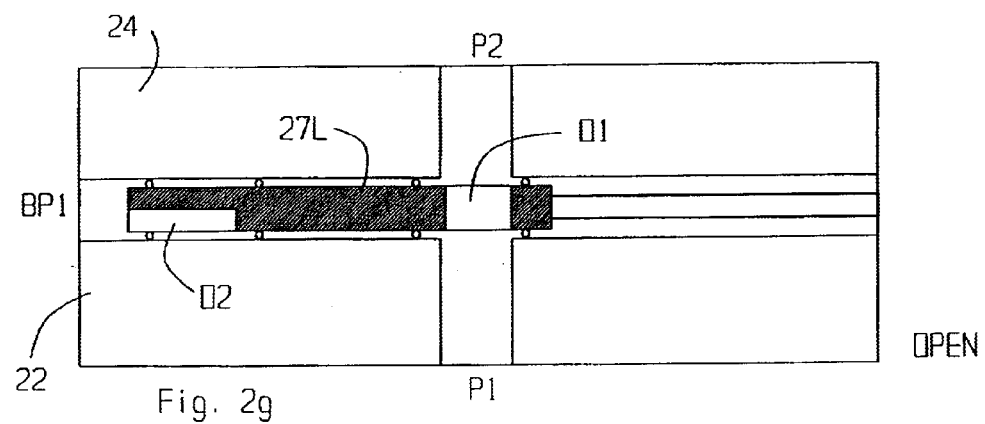
Fig. 2g — OPEN
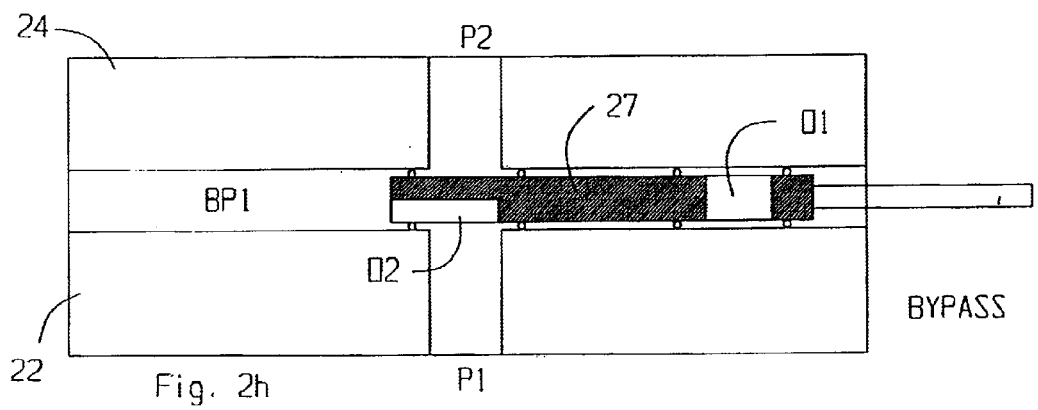
Fig. 2h — BYPASS

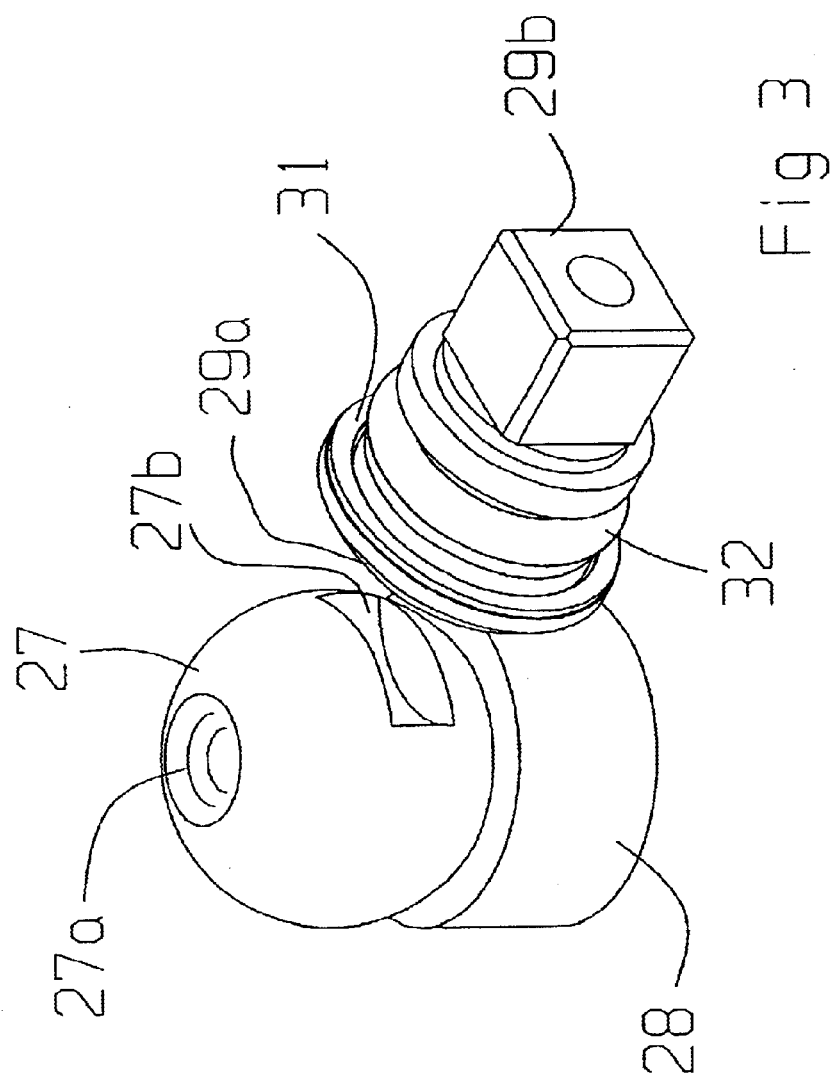

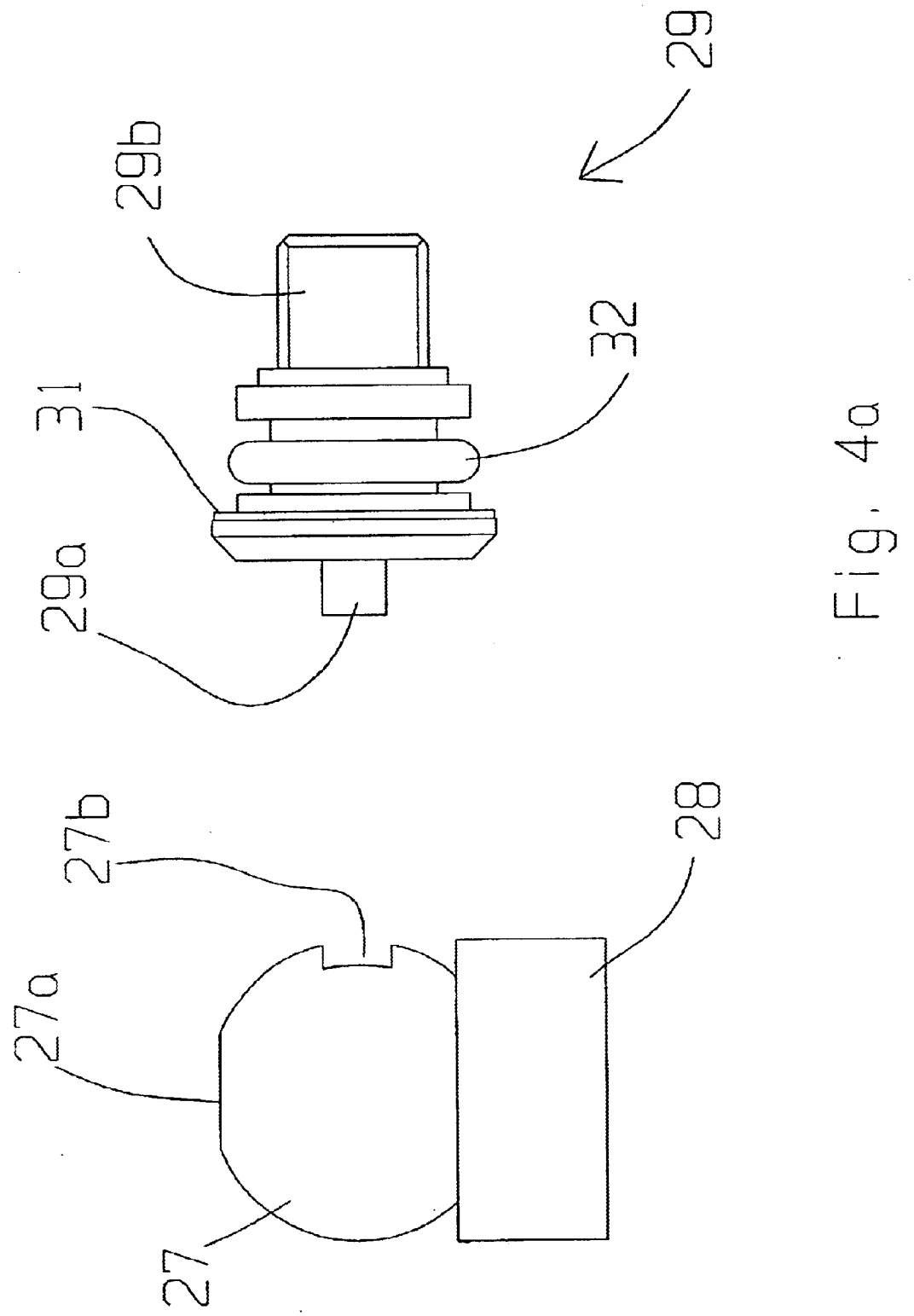

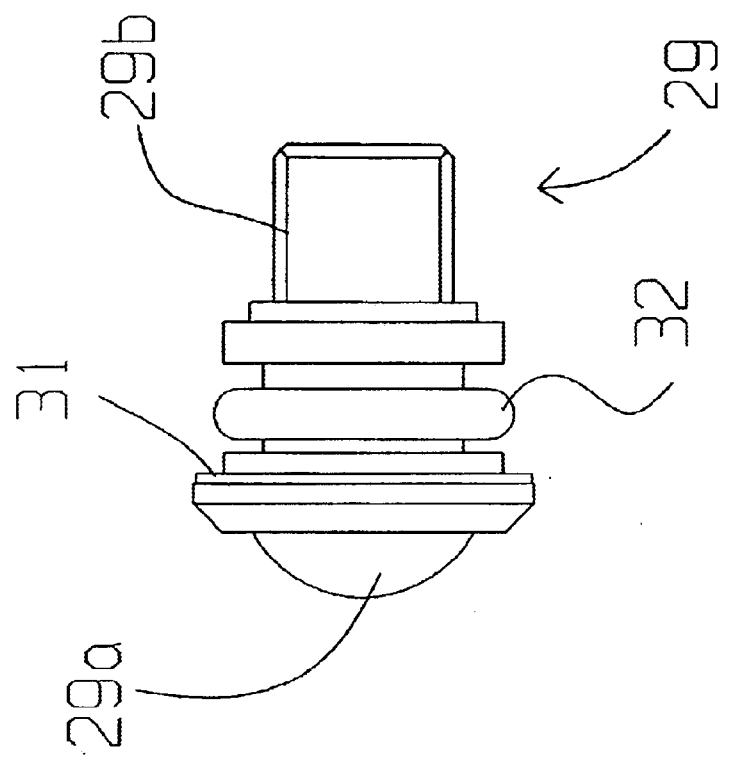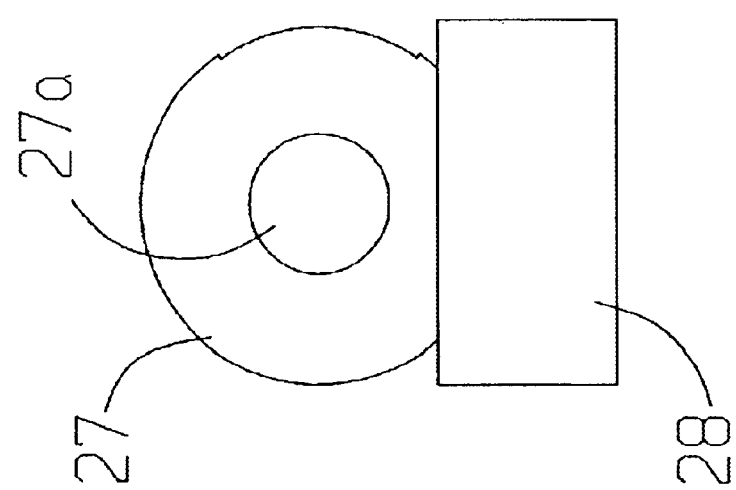
Fig. 4b

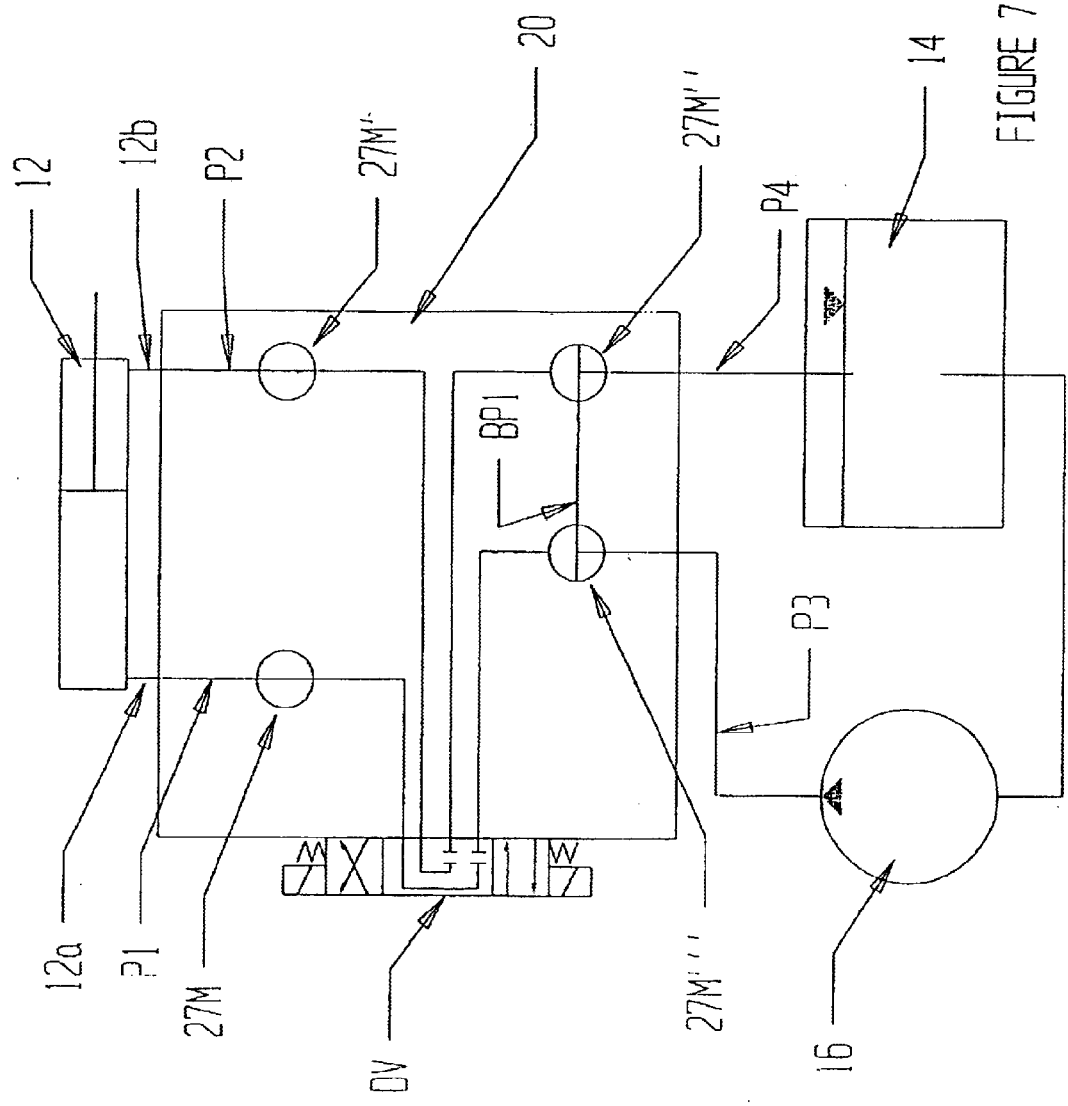

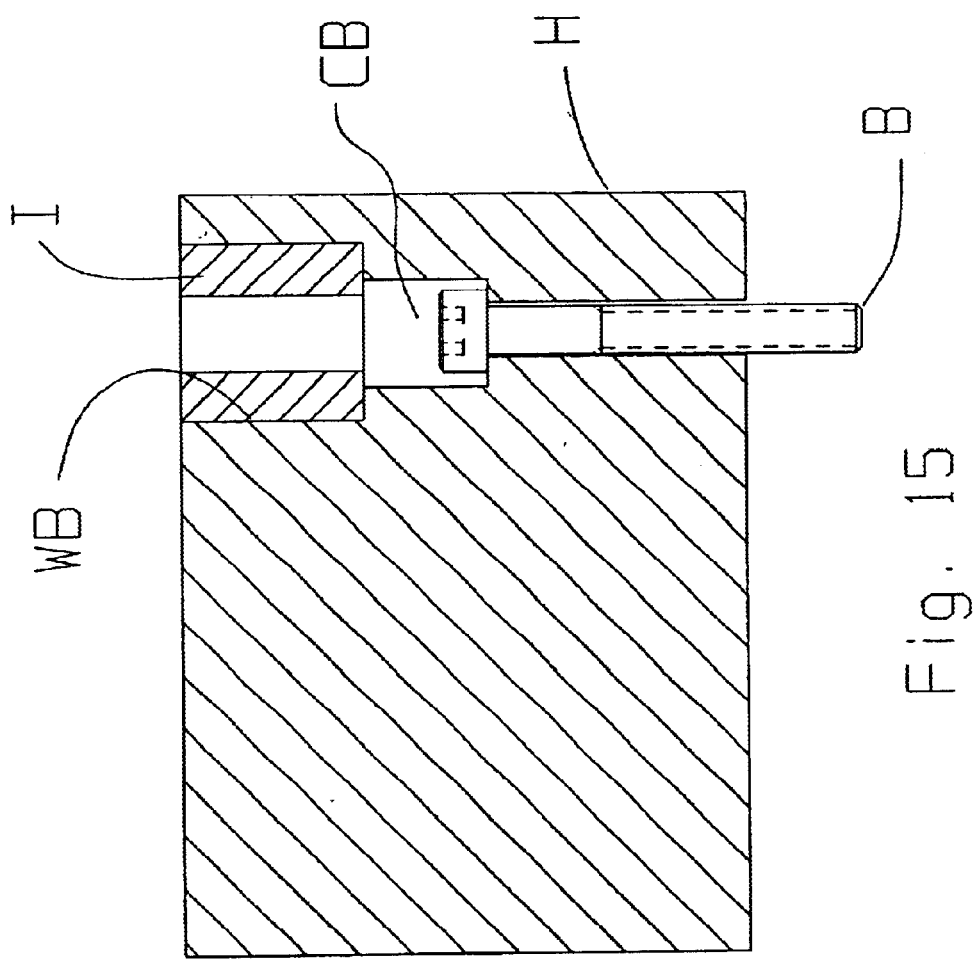

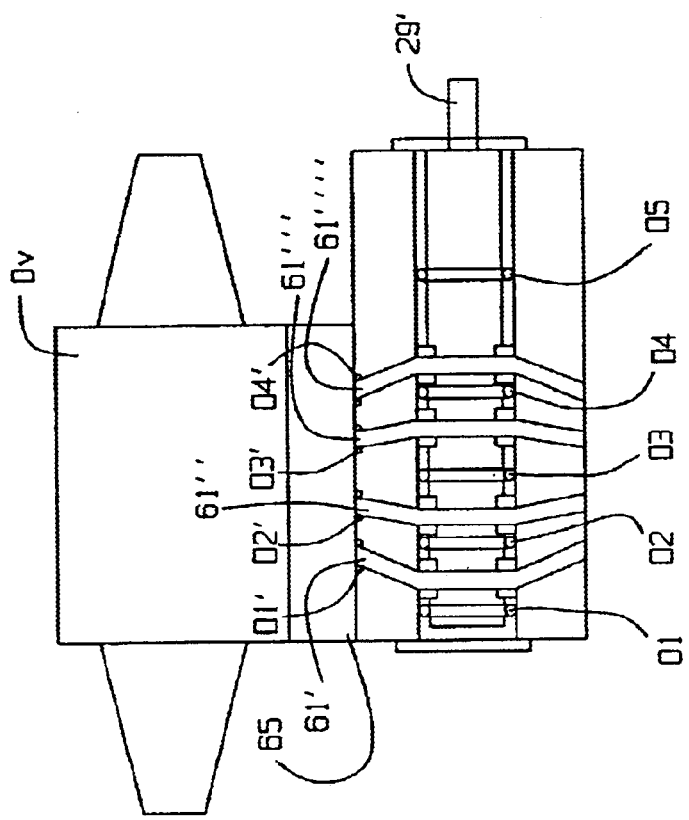
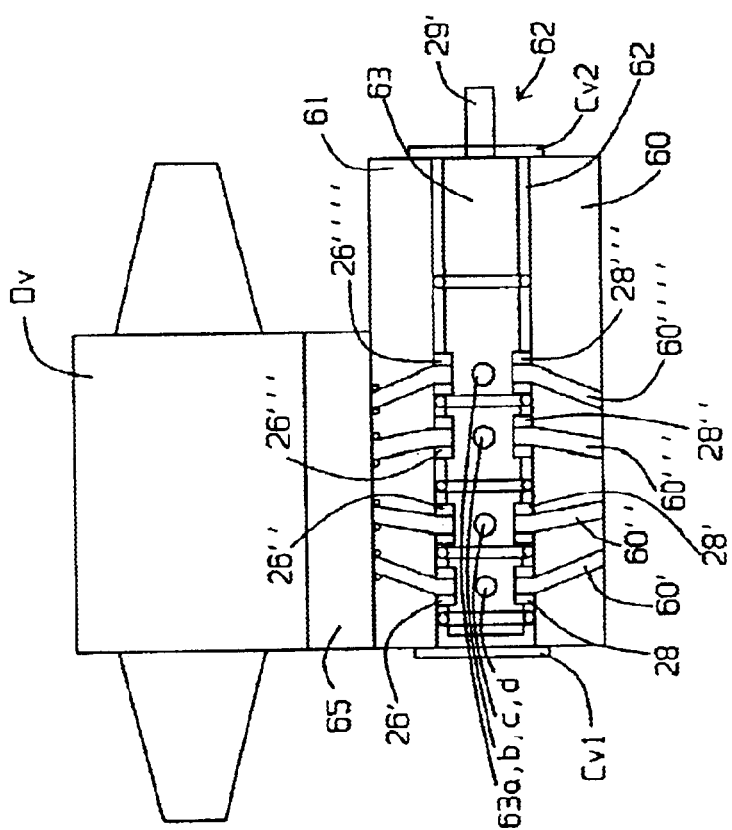
Fig. 16 a
Fig. 16 b

HYDRAULIC ISOLATION VALVE

BACKGROUND

The present invention relates to isolator valves. More particularly, the present invention is directed to isolator valves for preventing flow to or from directional valves and the like to protect personnel from injury as well as preventing unwanted spillage and to perform tests on the hydraulic circuit incorporating the isolator valves without disassembly.

Hydraulic directional valves direct pump flow into actuators which may be cylinders, motors or the like. Directional valves, such as a directional valve $D_v$ shown in the system 10 of FIG. 1, are designed as stackable modules typically mounted upon sub-plates such as the sub-plate $S_P$ shown in FIG. 1. The sub-plate $S_P$, has ports PT at appropriate places about the housing of the sub-plate for respectively coupling a tank 14 and a pump 16 to one set of ports, the ports of the directional valve $D_v$ and the ports 12a and 12b of an actuator 12. The necessary ports may be on the sides or the bottom of the subplate. If the subplate is longer than the modules stacked thereon, see FIG. 13, the ports may be on the top of the subplate in a region displaced from the modules.

The directional valve $D_v$ shown in FIG. 1 is operable to block flow, direct flow from pump 16 into port 12a and flow to tank 14 from port 12b or alternatively to direct flow from pump 16 to port 12b and direct flow from port 12a to tank 14. The pump 16, tank 14 and actuator 12 are coupled to the sub-plate ports by suitable piping P. The sub-plate serves to couple hydraulic devices between the input (pump) and output (tank) devices and the load device (actuator). Although no modules are shown stacked on the subplate of FIG. 1, it should be understood that a number of such modular devices may be stacked upon the sub-plate.

The sizes of the directional valves and sub-plates as well as the number and location of ports and flow paths are typically in accordance with national and international standards. The United States uses the NFPA standard whereas the DIN and ISO standards find commonplace use in Europe. Depending on the particular application, the directional valve $D_v$ may be mounted upon the top of other modular or "sandwich" valves which provide functions other than directional functions, i.e. pressure relief, counterbalance and the like. Note, for example, FIG. 13 which shows three (3) stacked hydraulic circuits, C1 through C3, each stack having directional valves Dv mounted upon modular or sandwich valves $S_v$, $S_v'$ and $S_v''$, which in turn are mounted upon common sub-plate $S_P$. The sub-plate is provided with ports $SP_T$ for connection to appropriate tubing or other conduits in order to interconnect other components of the hydraulic system such as, for example, a pump and a tank (not shown).

FIGS. 14 and 14a show further details of a typical modular or "sandwich" valve arrangement. FIG. 14 shows a sectional view of a hydraulic circuit comprised of stacked modular components which includes a base or sub-plate $S_P$ and modular valves $S_v$, $S_v'$, $S_v''$ and $S_v'''$ which are stacked in that order upon the sub-plate $S_P$. A directional valve $D_v$ is mounted upon modular valve $S_v'''$.

FIG. 14a shows a simplified hydraulic circuit in schematic form and representing the modular components shown in FIG. 14. In the example given, the sub-plate $S_P$ has ports P and T respectively for coupling a pump and tank thereto, typically by suitable piping. The output ports A and B are coupled to a load device, also by suitable piping. The relief modular valve $S_v$ and the check modular valve $S_v'$ are coupled between the ports P and T and directional valve $D_v$. The check modular valve $S_v'''$ and the flow regulator modular valve $S_v''$ are coupled between the directional valve $D_v$ and the output ports A and B. The modularity allows any type of hydraulic circuit to be set up without the need for piping simply by stacking. However, these systems lack the ability to enable the performance of certain tests and lack the capability of preventing spillage and/or harm to operating personnel at times when the hydraulic circuit must be disassembled for inspection, maintenance, repair or replacement.

SUMMARY

The present invention provides a novel isolator valve assembly which enables hydraulic circuits comprised of stacked modules to be easily and readily disassembled without endangering operating or maintenance personnel and without spillage of hydraulic fluid and further enabling certain tests to be performed on portions of the hydraulic circuit without the need to disassemble or to disrupt operation of remaining portions of the hydraulic circuit, as will be understood from a consideration of the detailed description of the invention.

BRIEF DESCRIPTION OF THE DRAWINGS(S)

The objects and advantages of the present invention will be best understood from a consideration of the drawings in which like elements are designated by like numerals, wherein:

FIG. 2f shows another valve assembly embodiment and the closed position.

FIGS. 2g and 2h respectively show the valve assembly of FIG. 2f in open and bypass positions.

Figure 2:
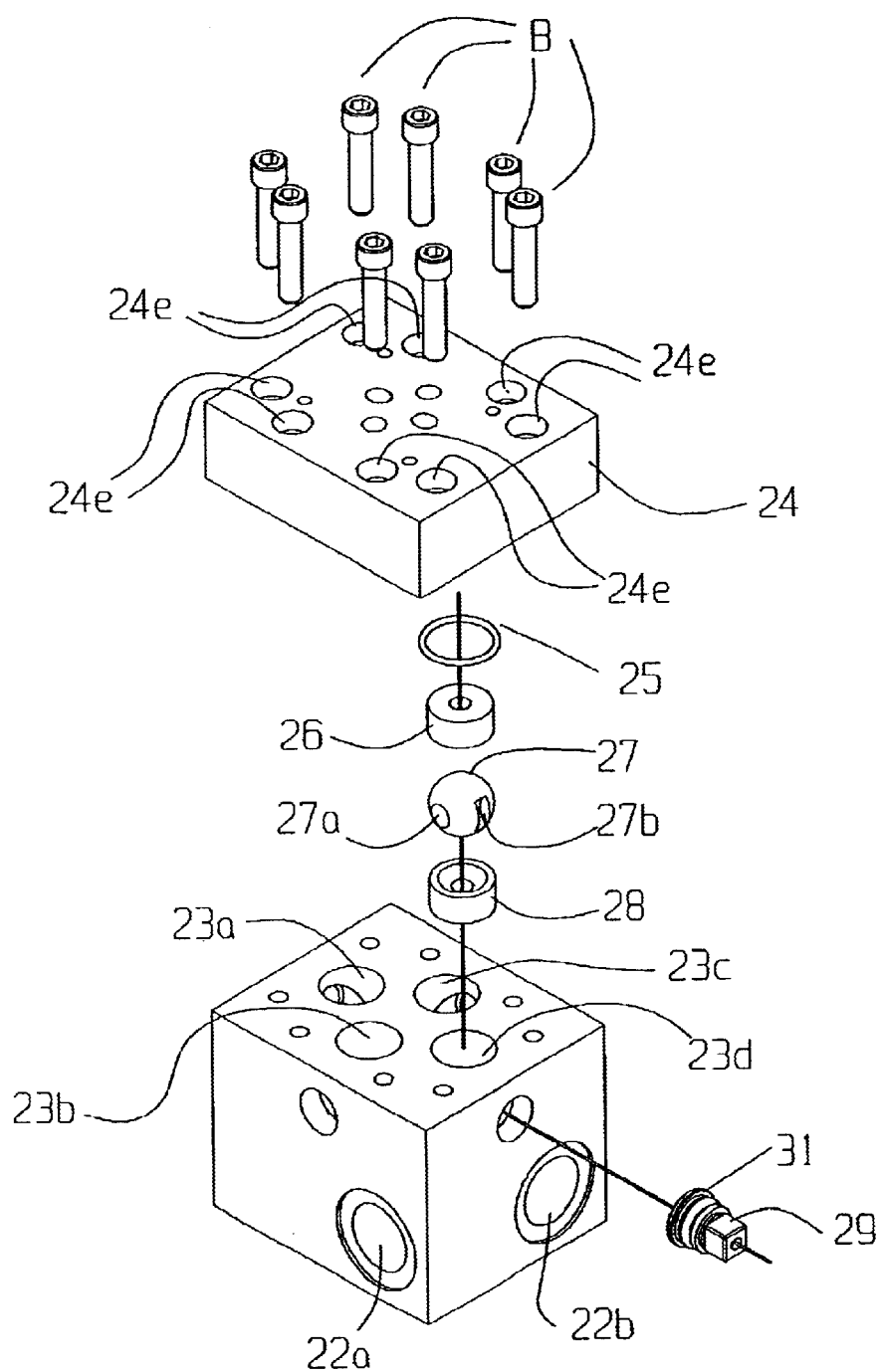
FIG. 2 shows an exploded view of an isolator valve assembly embodying the principles of the present invention.

FIG. 3 is an exploded perspective view showing a ball valve/stem ring assembly of FIG. 2 in greater detail.

FIGS. 4a and 4b respectively show elevational views of the assembly of FIG. 3 in the open and shut-off positions.

Figure 5:
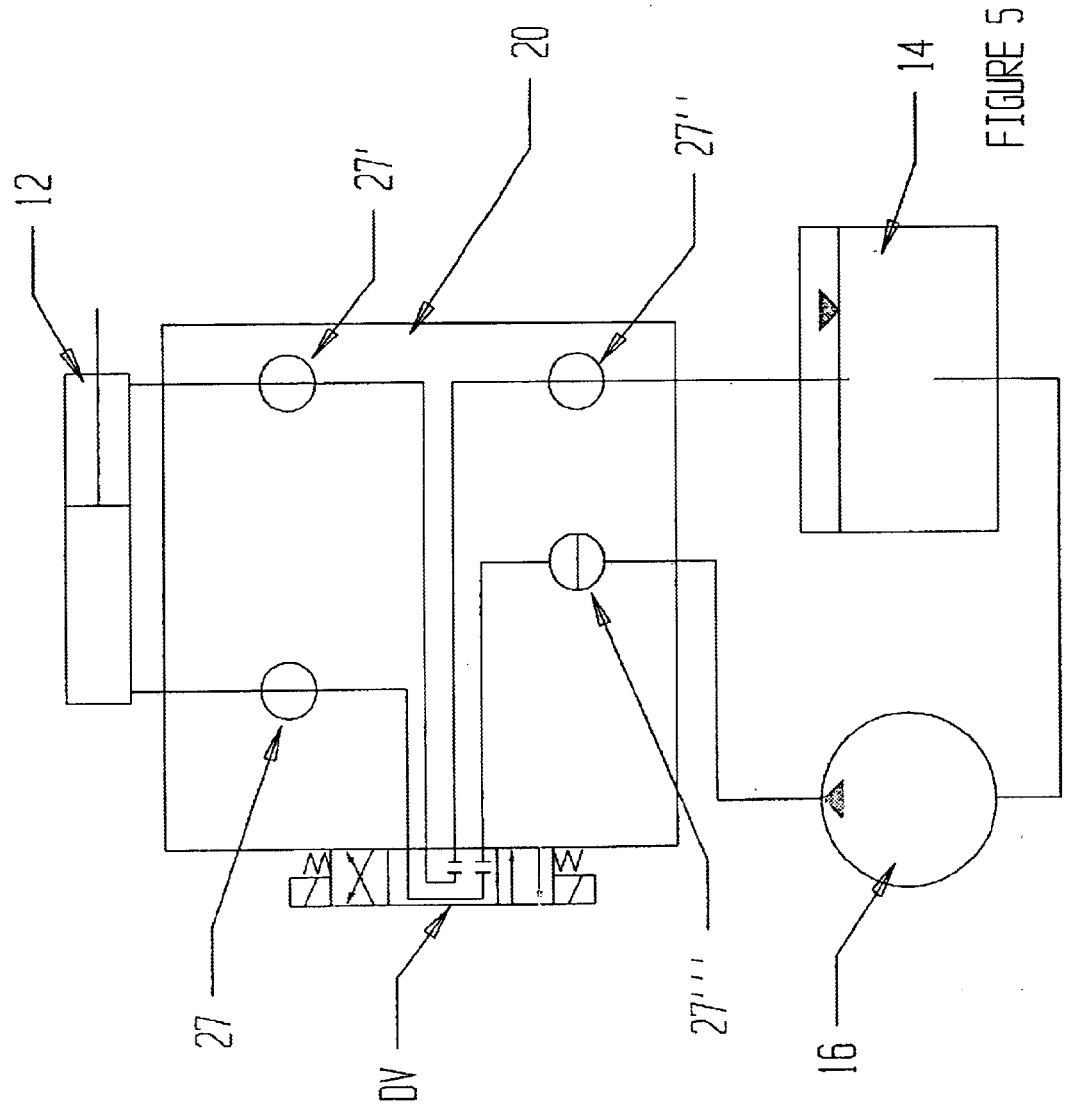

FIG. 5 shows a hydraulic circuit employing an isolator valve of the present invention employed for de-bugging and/or servicing operations.

Figure 6A:
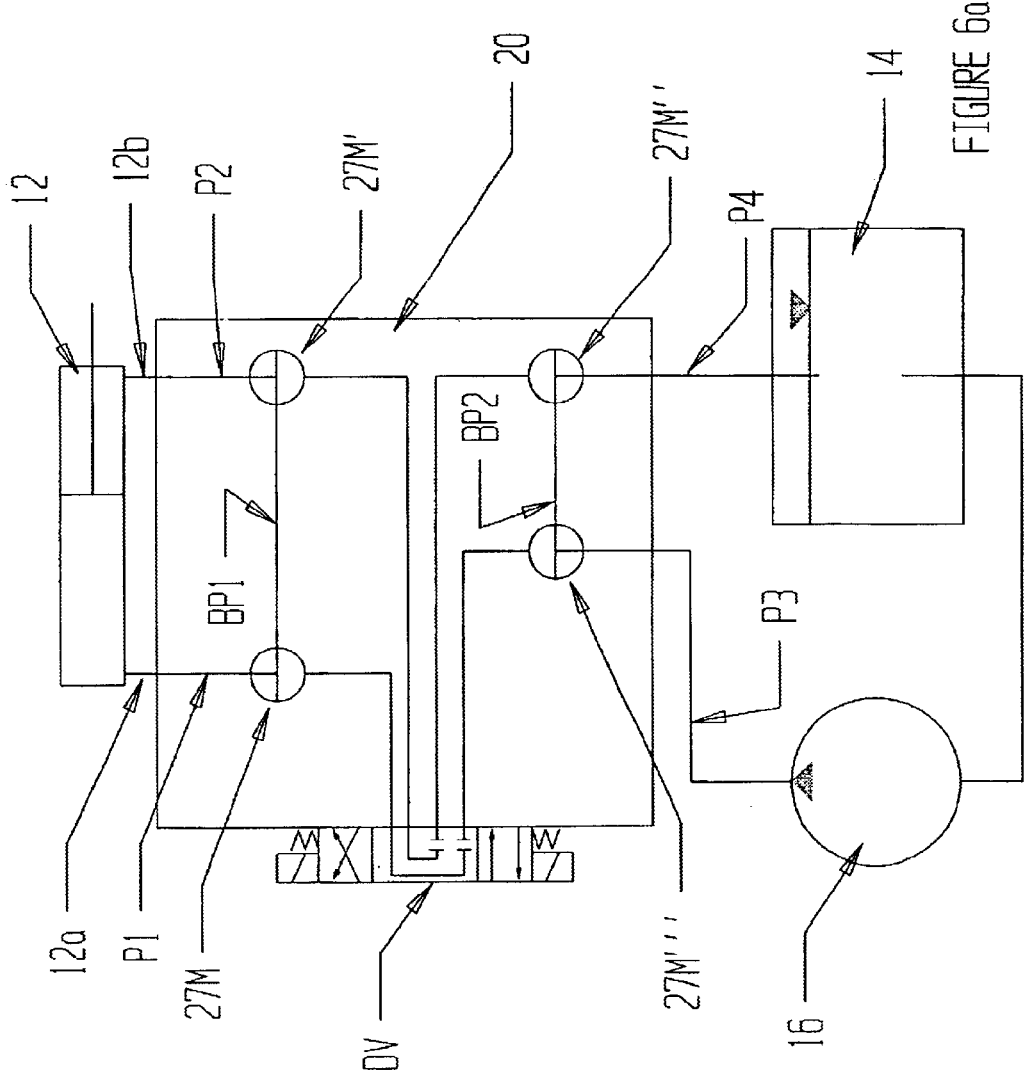
Figure 6B:
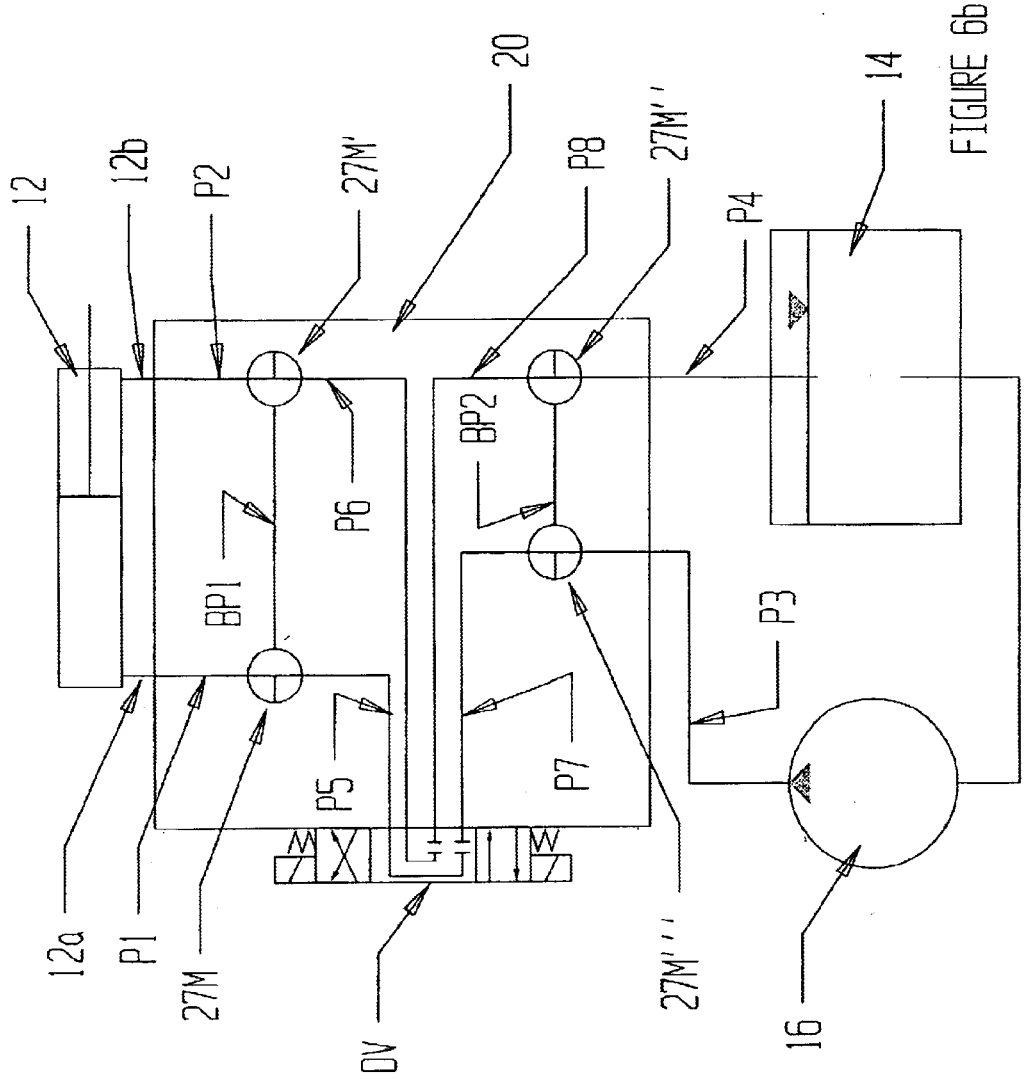

FIGS. 6a and 6b show a hydraulic circuit employing an isolator valve assembly of the present invention designed to enable the directional valve to be bypassed and respectively showing the isolator valve assembly in the bypassed and normal positions.

FIG. 7 shows a hydraulic circuit incorporating an isolator valve assembly of the present invention arranged to permit downloading of the pump.

Figure 8:
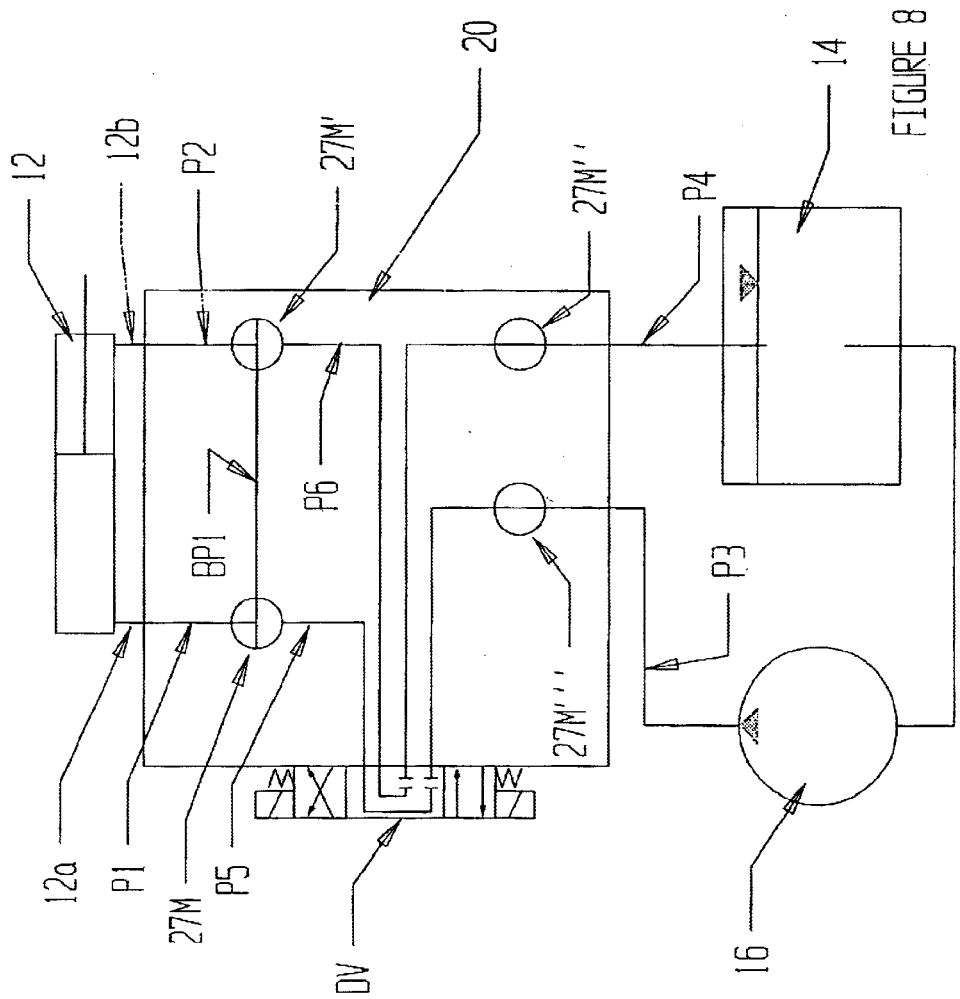

FIG. 8 shows a hydraulic valve circuit incorporating an isolator valve assembly of the present invention which is utilized to enable connection of the actuator ports together to "float" the actuator in the hydraulic circuit.

Figure 8B:
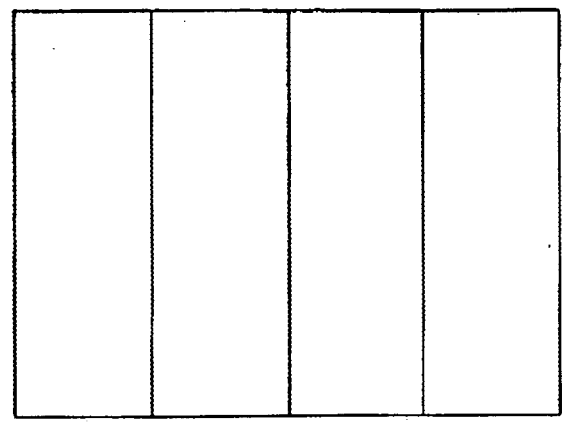
Figure 8A:
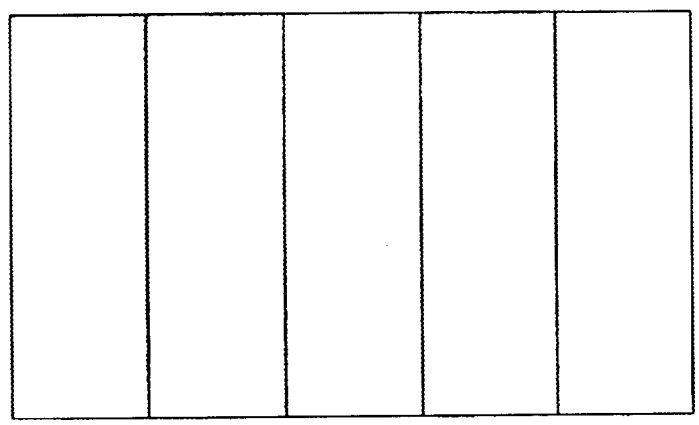

FIGS. 8a and 8b are simplified diagrams of a stacked hydraulic circuit useful in explaining the different arrangements in which isolator valve modules may be employed.

Figure 9A:
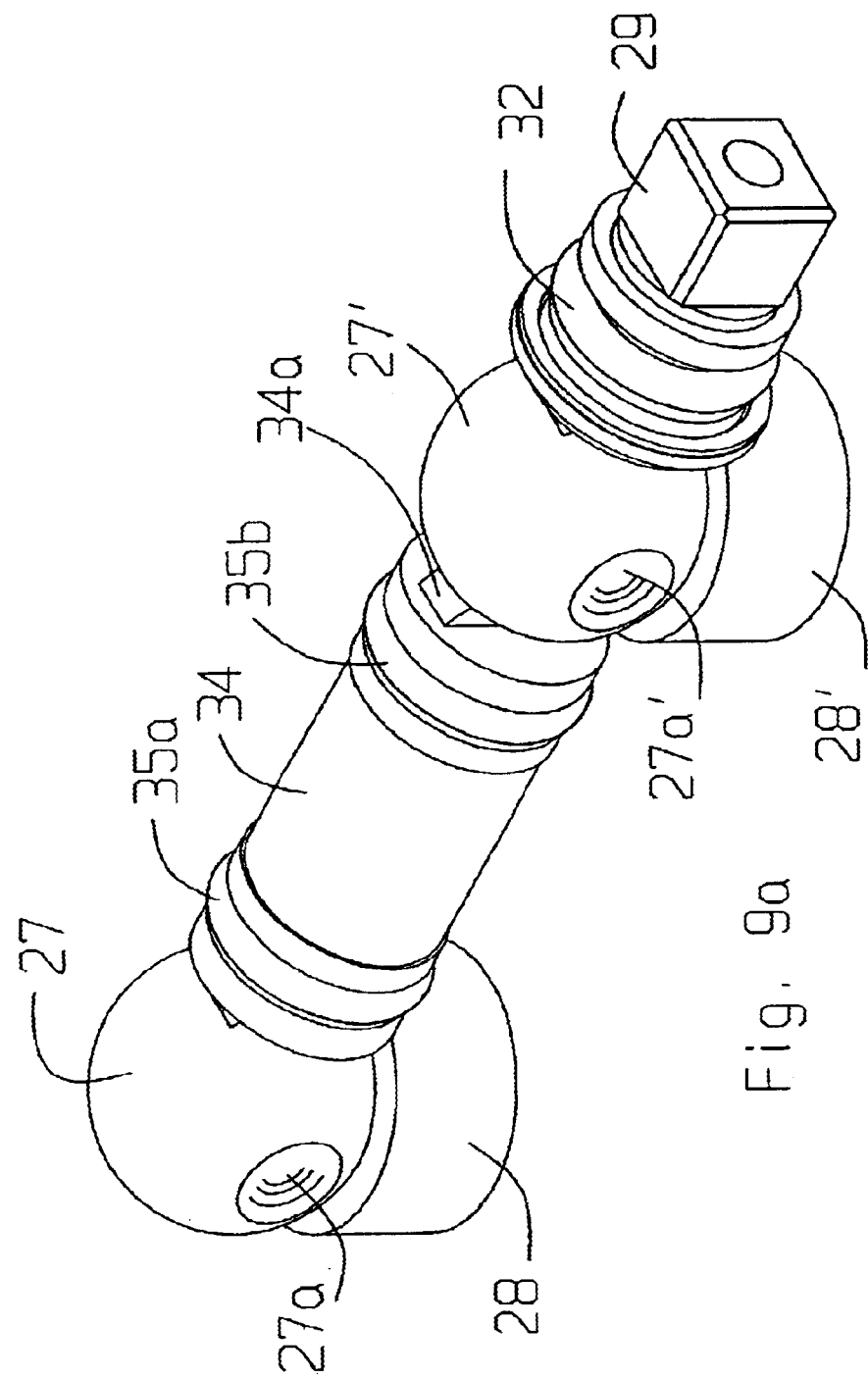
Figure 9B:
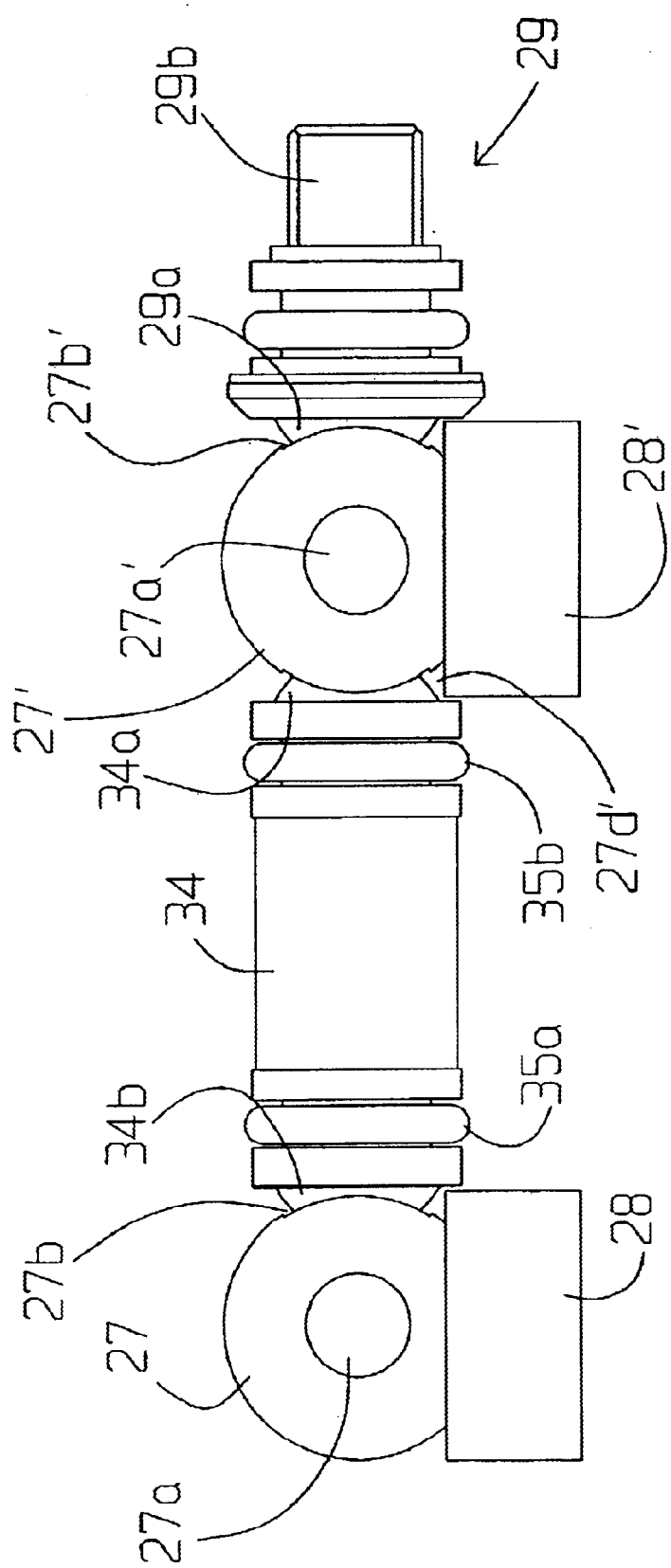

FIGS. 9a and 9b respectively show perspective and elevational views of a ball valve and control assembly enabling the operation of two ball valves through a single drive stem.

Figure 10:
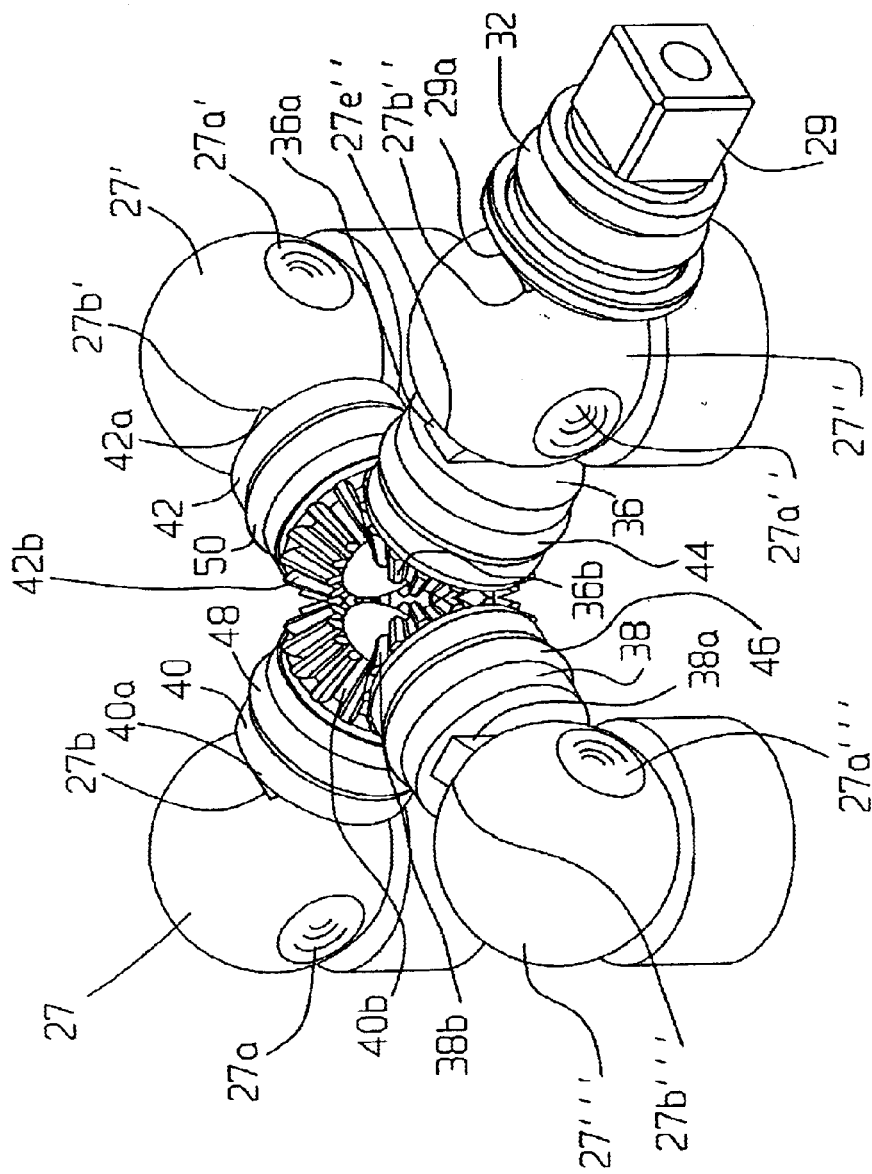

FIG. 10 is a perspective view showing a ball valve assembly wherein four ball valves are driven by a single drive stem.

FIG. 10a is a perspective view showing the ball valve assembly of FIG. 10 wherein one of the ball valves is driven independently of the remaining three (3) ball valves.

Figure 11:
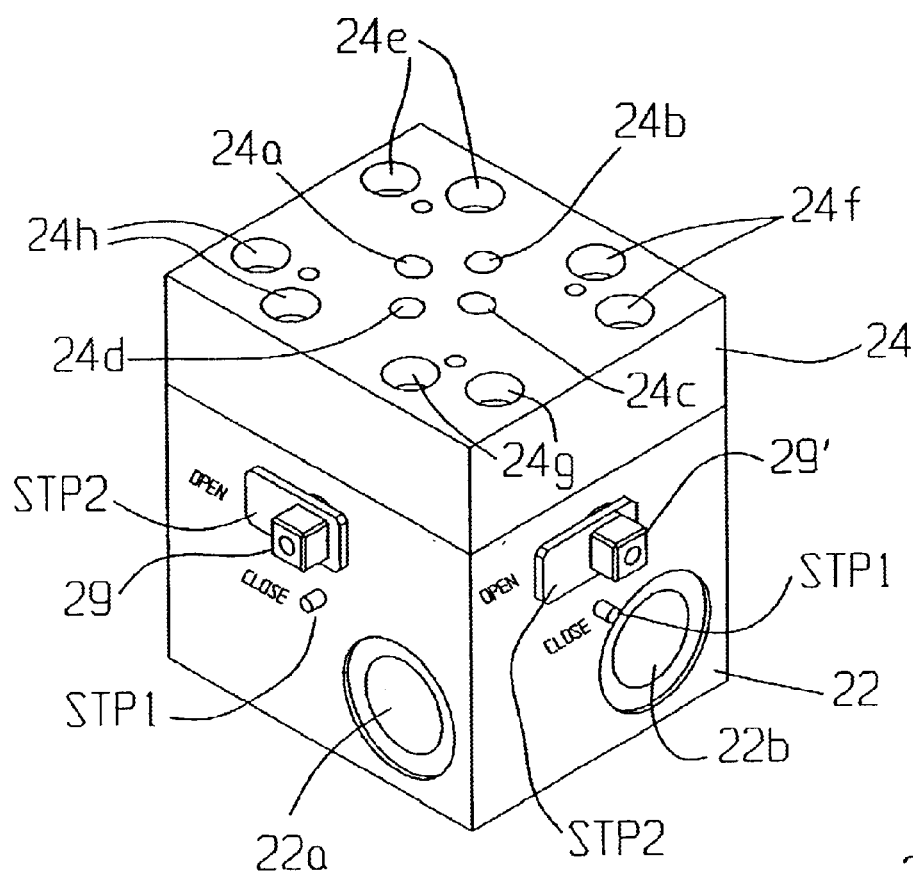

FIG. 11 is a perspective view showing an assembled sub-plate type of isolator valve.

Figure 12:
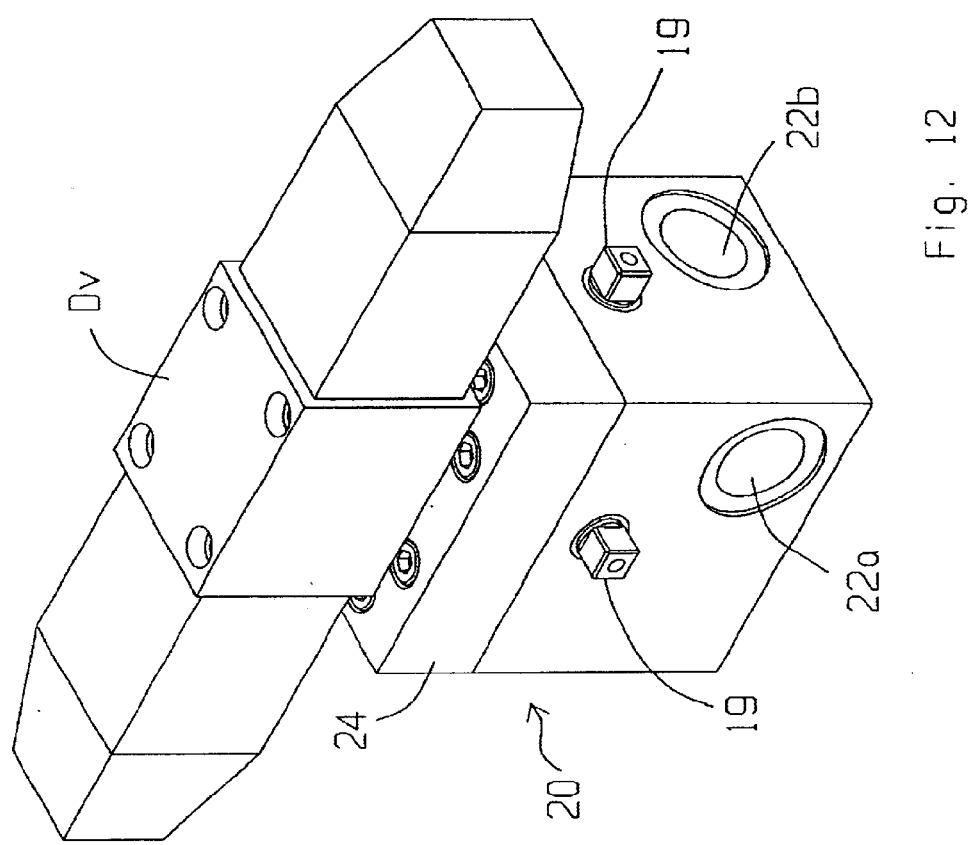

FIG. 12 shows an assembled sub-plate type of isolator valve having a directional valve mounted upon the isolator valve assembly.

Figure 13:
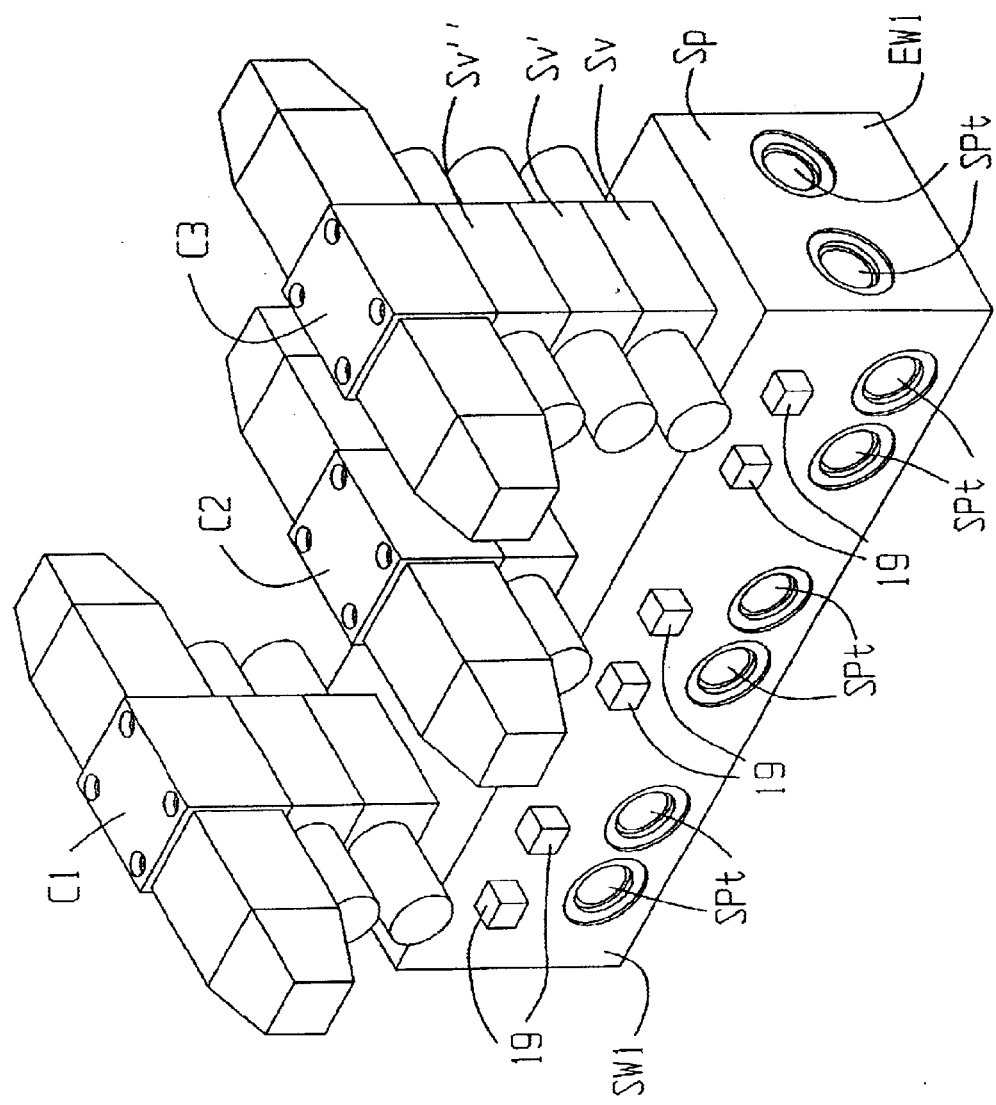

FIG. 13 shows a hydraulic system comprising conventional modular "sandwich" valves and directional valves stacked upon a sub-plate designed for multiple stacks and which incorporates the novel isolator ball valves of the present invention.

Figure 14:
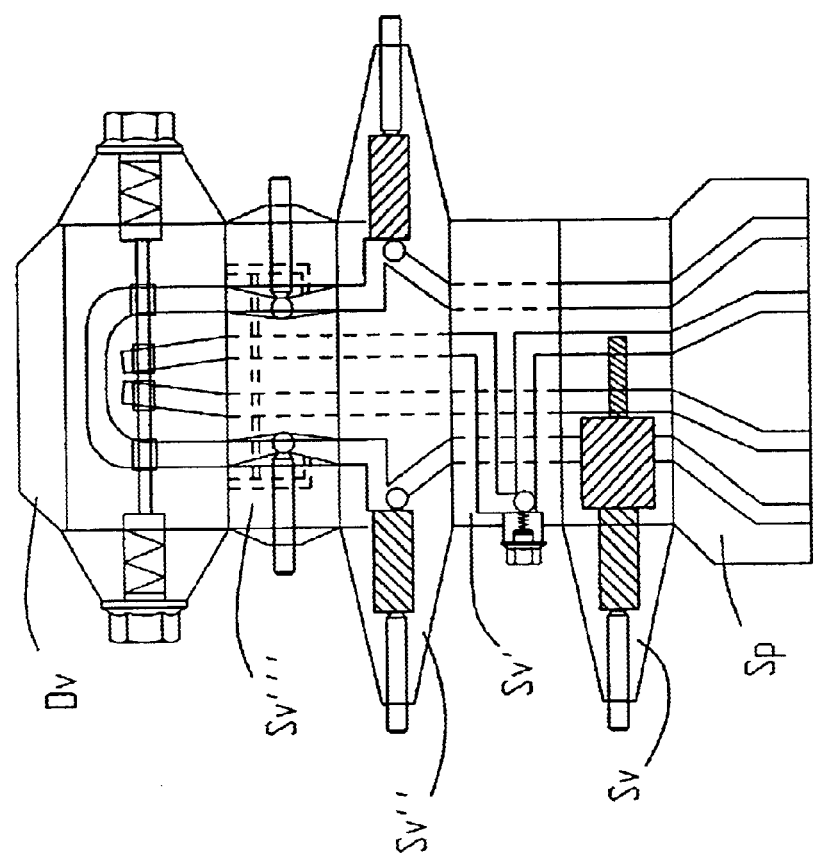
Figure 14A:
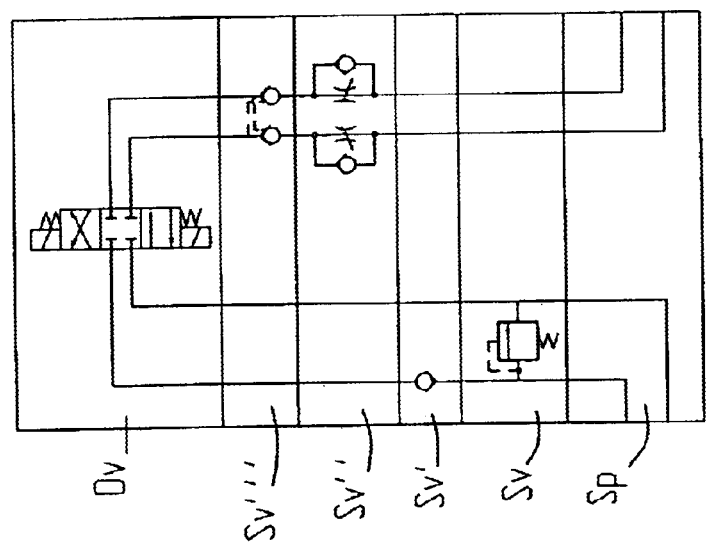

FIGS. 14 and 14a respectively show a sectional view of a conventional hydraulic system comprised of modular components and a simplified schematic circuit of the components shown in FIG. 14.

FIG. 15 is a sectional view of an isolator valve assembly housing showing another mounting arrangement.

FIGS. 16a and 16b show still another valve assembly of the present invention and respectively show the hydraulic circuits being closed and open.

Figure 17:
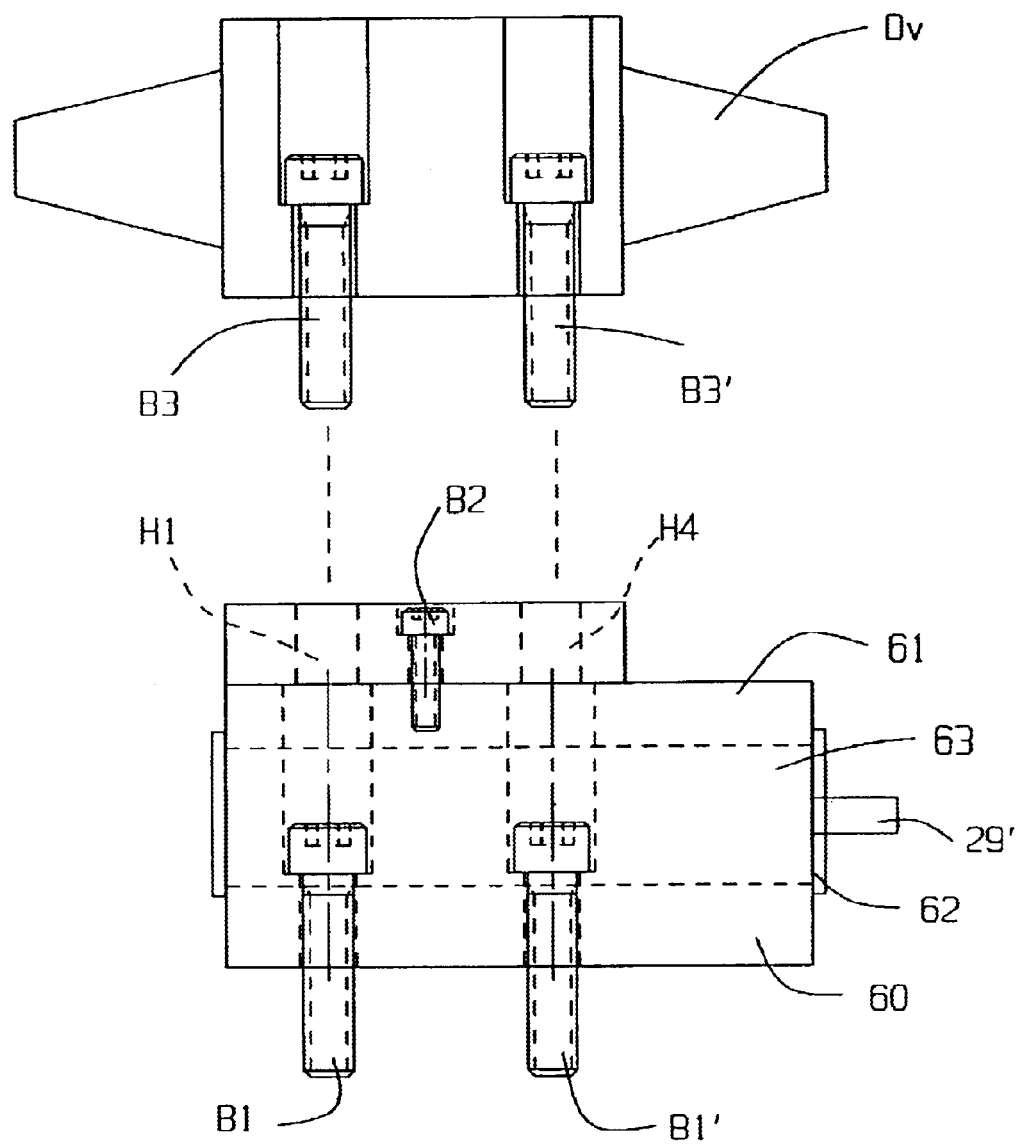

FIG. 17 is an exploded view useful in explaining the assembly sequence of the sandwich type isolator valve shown in FIGS. 16a and 16b.

DETAILED DESCRIPTION OF THE PREFERRED EMBODIMENT(S)

When a directional valve requires replacement and/or disassembly in a conventional hydraulic circuit, there is always oil spillage as well as potential endangerment to the safety of personnel. In order to perform such replacement, maintenance personnel must shut down the entire hydraulic system, especially the pump, and then drain the directional valve and the associated hydraulic circuit. Even after careful draining, there is still oil spillage present due to the fact that the actuator, as well as piping connecting the directional valve to the actuator, contains oil that leaks through the sub-plate when the directional valve is removed. Removing the directional valve can also be dangerous in situations where the system may contain residual pressure which could be derived from accumulators and other various hydraulic components. Another source of danger in a hydraulic system could be caused by a lifting cylinder controlled by the directional valve. For example, if the lifting cylinder is holding up a load, removal of the directional valve could cause the load to fall. A falling load could force fluid out of the cylinder and through the sub-plate onto maintenance personnel.

The present invention solves the oil spillage problem and at the same time provides safety for servicing personnel. The invention provides complete circuit isolation enabling removal of a directional valve, even while the pump continues to run. The isolator valve assembly of the present invention also has the capability of enabling performance of various tests without disassembling the hydraulic circuit, as will be described in detail here and below.

The isolator valve of the present invention may be configured either as a sub-plate module or as a sandwich body module, i.e. capable of being sandwiched between upper/lower modular components in a stacked system of modules. FIG. 2 shows an exploded view of an isolator valve assembly 20 incorporating shut-off balls 27 (only one being shown for purposes of simplicity) provided in the valve body to control flow in each of the four (4) passageways. However, a lesser or greater number of ball valves and passageways may be provided. The isolator valve assembly 20 shown in FIG. 2, depicts a DO3 (NFPA Standard) flow pattern. However, the same design principles hold true for any standard as well as non-standard flow patterns.

Isolator valve assembly 20 is comprised of a cover plate 24 and a valve body 22 held together by bolts B. The isolator valve assembly shown in FIG. 2 is a sub-plate design and therefore is provided with four ports each arranged on one of the four sidewalls of housing 22, only ports 22a and 22b being visible in FIG. 2. If desired, these ports can be located along the bottom of the isolator valve housing 22. Also one or more ports can be provided on a sidewall.

Figure 2A:
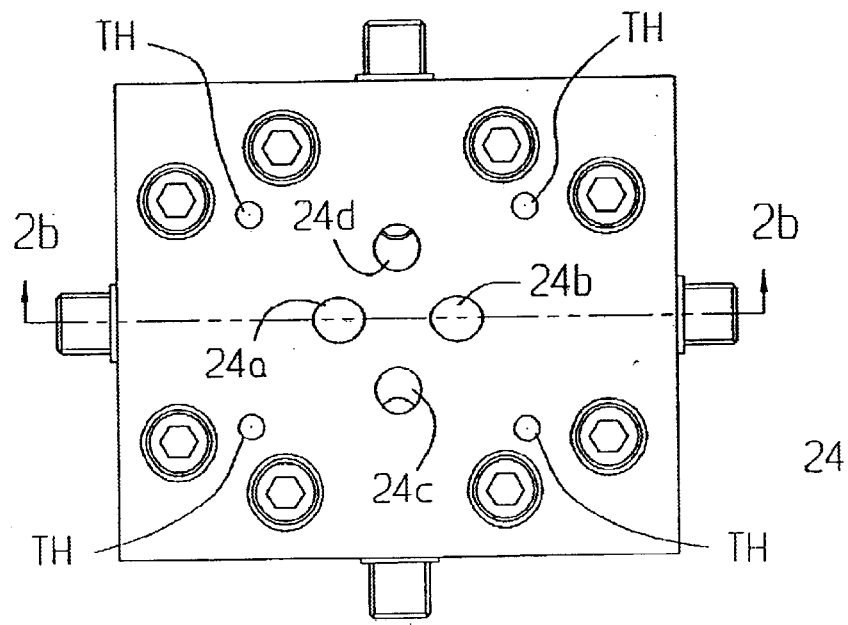
FIG. 2a shows a top view of the isolator valve assembly of FIG. 2.

Suitable piping or tubing (not shown for purposes of simplicity) connects the pump line, the tank line and two actuator lines to the four ports. The DO3 pattern has four flow paths, thus the isolator valve assembly has four sets of shut-off balls 27 to control each of the flow paths. For the sake of simplicity, FIG. 2 shows an exploded view of only one of the four identical ball assemblies which includes an O-ring 25 which provides a seal between housing 22 and cover plate 24, a pair of cylindrical-shaped, hollow ball washers 26 and 28 respectively arranged above and below the ball 27 to seal the shut-off ball 27. The shut-off ball, in one embodiment, has a passageway 27a extending therethrough for selectively providing passage of fluid flow when the passage is aligned with an associated one of the flow paths 23a through 23d in the cover plate 24 and housing 22, enabling fluid flow through the isolator valve. FIG. 2c shows the modular housing 20 of FIG. 2 with the drive stems omitted to more clearly show the passageways within the module.

Figure 2B:
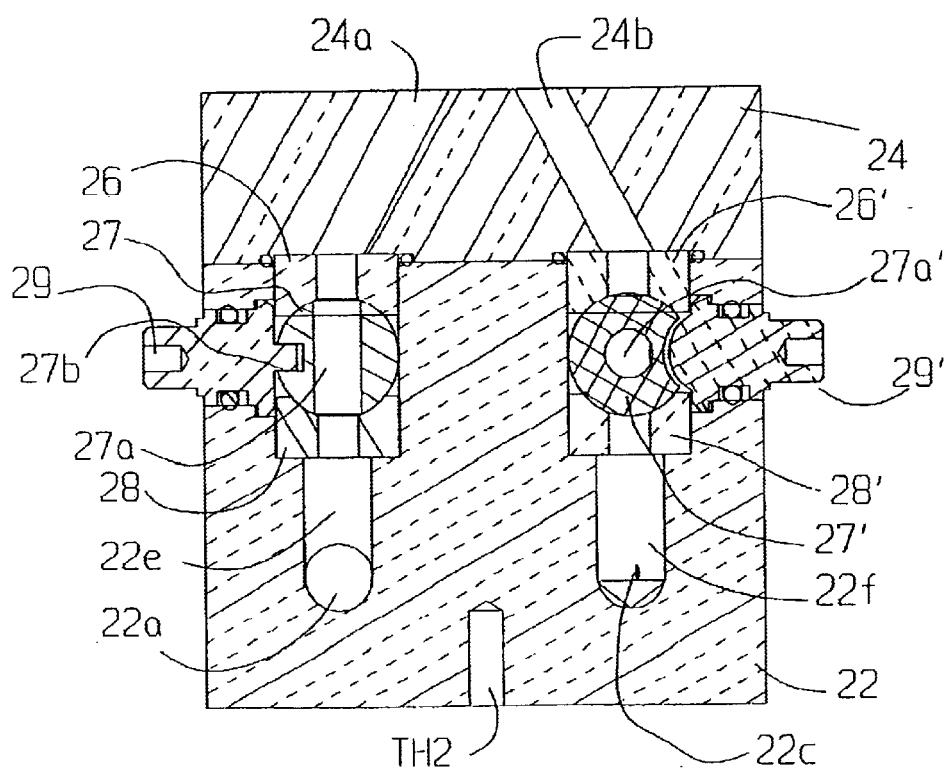
FIG. 2b shows a sectional view of the isolator valve assembly shown in FIG. 2.
Figure 2C:
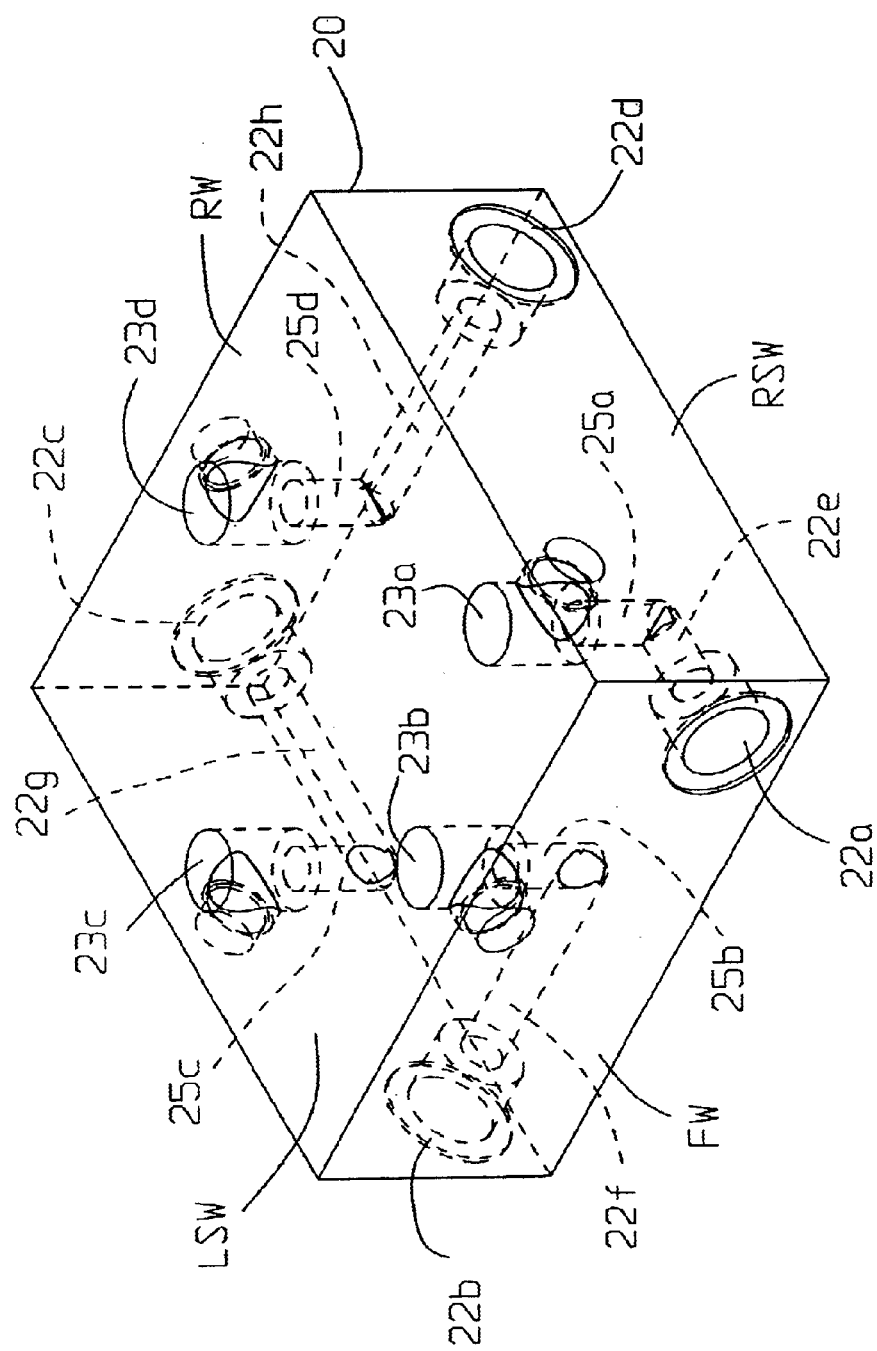
FIG. 2c is a detailed view of the module of FIG. 2 showing the ports and the connecting passageways.

Making reference to FIG. 2b, left-hand ball valve 27 is shown as rotated about a horizontal axis to a position so that its passageway 27a is aligned with passageway 22e in housing 22 and passageway 24a in cover member 24. The right-hand ball valve 27' is shown as rotated 90° relative to the position shown by left-hand ball valve 27 and has its passageway 27a' arranged perpendicular to passageways 22f and 24b, thereby blocking flow.

Each ball 27 is provided with a key slot 27b, see FIGS. 3, 4a and 4b, which receives a projection 29a of a shut-off drive stem 29, rotatable about its longitudinal axis. In the embodiments shown in FIGS. 2, 2b, 3, 4a and 4b, the drive stems are horizontally aligned. The drive stems 29 are rotatably mounted within housing 22 and preferably have a square knob portion 29b extending outwardly from housing 22 for rotating the ball from a location outside of the isolator valve body 22. The knob may be round or have a slot or recess for receiving a screwdriver, allen wrench or other turning means. Other alternative arrangements may be used as will be described below. A thrust washer 31 facilitates turning of the drive stem. O-ring 32 provides a liquid-tight seal. The tapped holes TH provided in cover 24, as shown in FIG. 2a, conform to the DO3 standard for mounting holes for the directional valve. A mounting cap hole TH2, shown in FIG. 2b, is provided along the underside of housing 22 for coupling the isolator valve assembly to a support structure (not shown for purposes of simplicity).

Each drive stem 29 is arranged to protrude from one side wall of housing 22 and may or may not be adjacent to a port which it regulates. Appropriate markings are provided along the sidewalls to identify the passageway to be controlled by such ball valve such as pump, tank, port or load device, etc., as well as markings such as "OPEN" and "CLOSED," as shown in FIG. 11.

FIGS. 3, 4a and 4b show the ball 27, thrust washer 31, O-ring 32 and the lower ball washer 28 in greater detail, the drive stem assembly 29 being shown displaced from the ball to facilitate an understanding of the manner in which the projection 29a and slot 27b cooperate to assure positive operation of the ball valve when rotated by the drive stem. The cross-sections of the projection 29a and slot 27b are in conformity to assure positive drive.

Figure 1:
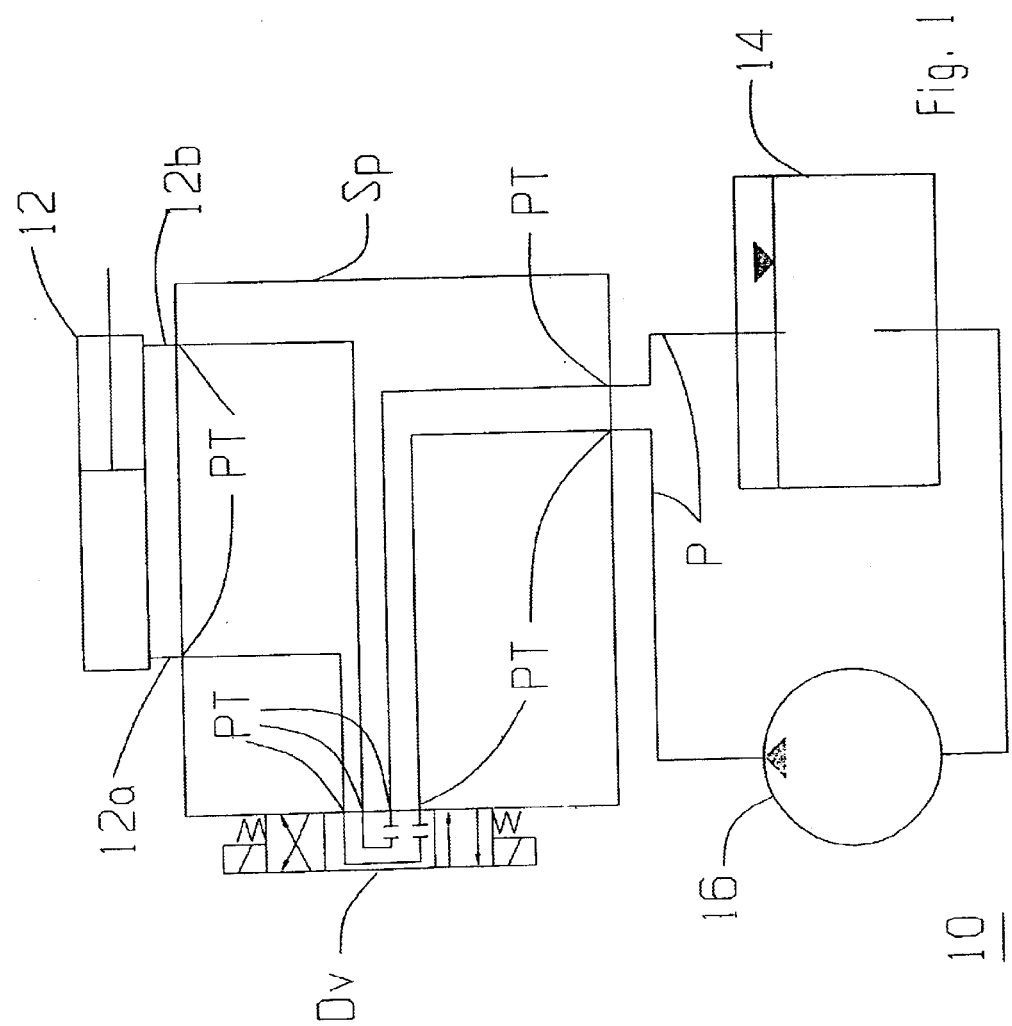
FIG. 1 is a simplified schematic diagram of a conventional hydraulic circuit incorporating a directional valve.

As was set forth here and above, the sub-plate design of isolator valve 20 has ports to receive fittings for piping or tubing whereas the sandwich body type has the same flow path configuration on both of its top and bottom surfaces enabling it to be "sandwiched" between a sub-plate and a directional valve, for example, or between other sandwich valves or between other combinations of a sub-plate, other sandwich valves and a directional valve. Thus, the embodiment shown, for example, in FIGS. 1 and 2b, functions as a sub-plate. By arranging the ports that are otherwise on the side walls of the embodiment shown in FIGS. 2 and 2b along the undersurface of housing 22, this enables the isolator valve assembly so modified to be "sandwiched" between other modular components of the hydraulic system.

The present invention solves the oil spillage problem and at the same time provides safety for servicing personnel by enabling complete circuit isolation in the flow paths extending therethrough to permit removal of a directional valve from the hydraulic system even while the pump is running.

In the embodiment shown in FIG. 2c, each port 22a through 22d is respectively coupled to an associated ball valve assembly through a horizontal passage 22e through 22h and a vertical passage 25a through 25d leading to the underside of each lower washer 28 and ball 27, as shown in FIG. 2b. The vertical passageways through the upper washers such as 26, 26' extend through the diagonally aligned passageways in lid 24 and between the respective balls 27 and the ports 24a through 24d in lid 24, as shown in FIGS. 2a and 2b.

The present invention provides for testing and debugging as well as solving the oil spillage problem while at the same time providing safety for servicing personnel in that complete or partial isolation can be selectively provided for every flow path enabling removal of a directional valve from the machinery even while the pump is running.

The present invention enables selective isolation of all or less than all of the flow paths for de-bugging and/or service. For example, it is possible with the isolator valve arrangement of the present invention to shut off just one of the flow paths, such as, for example, the pump line, to allow observation of the system without influence from the pump.

Noting FIG. 5, the hydraulic circuit shown therein, has balls 27' and 27" aligned to permit flow between the actuator 12 and the tank 14 while the ball valves 27''' and 27 are respectively closed and opened, isolating pump 16 and thereby enabling observation of the system without any influence from the pump. The locations of the directional valve and the ports, passageways and ball valves are different from those shown in FIG. 2c and have been arranged to simplify an understanding of FIG. 5. This is also true of FIGS. 6a–8.

Another advantage is the ability to bypass the directional valve mounted to the isolator valve assembly without removing it, thereby providing additional circuit flexibility. For this purpose, the ball valve is configured in the manner shown in FIG. 2d, wherein the modified ball valve 27M, in addition to having a through-passageway 27Ma, is provided with a passageway 27Mc which is perpendicular to and intersects and communicates with passageway 27Ma midway between the ends of the passageway 27Ma. The ball valve 27M, similar to ball valve 27, has a key slot 27Mb for cooperation with a drive stem 29. In addition thereto, the isolator valve assembly is provided with bypass passageways, as will be described.

More particularly, making reference to FIG. 6a, ball valves 27M and 27M' are rotated to the positions shown in FIG. 6a, coupling actuator port 12a through passageways P1 and P2 and bypass passageway BP1 to actuator port 12b. Similarly, ball valves 27M" and 27M''' are aligned to couple pump 16 directly to tank 14 through passageways P3 and P4 and bypass passageway BP2. Thus, actuator 12 is totally isolated from the remainder of the hydraulic circuit and is closed unto itself. In addition, pump 16 and tank 14 are totally isolated from the hydraulic circuit and are coupled directly to one another. This orientation totally isolates and bypasses directional valve $D_v$.

In FIG. 6b, the ball valves 27M through 27M''' are rotated to positions in which the directional valve $D_v$ has its outputs respectively coupled to port 12a through passageways P1 and P5 and to port 12b through passageways P2 and P6. Similarly, the inlet ports of directional valve $D_v$ are directly coupled to pump 16 through passageways P3 and P7 and are directly coupled to tank 14 through passageways P4 and P8, bypass passageways BP1 and BP2 being isolated (i.e., cut off) with the ball valve assemblies in the positions shown in FIG. 6b. FIG. 6b shows the positions to which the ball valves 27M" and 27M''' are rotated in order to isolate bypass passageway BP2 and to connect pump 16 and tank 14 to the directional valve $D_v$.

Figure 2D:
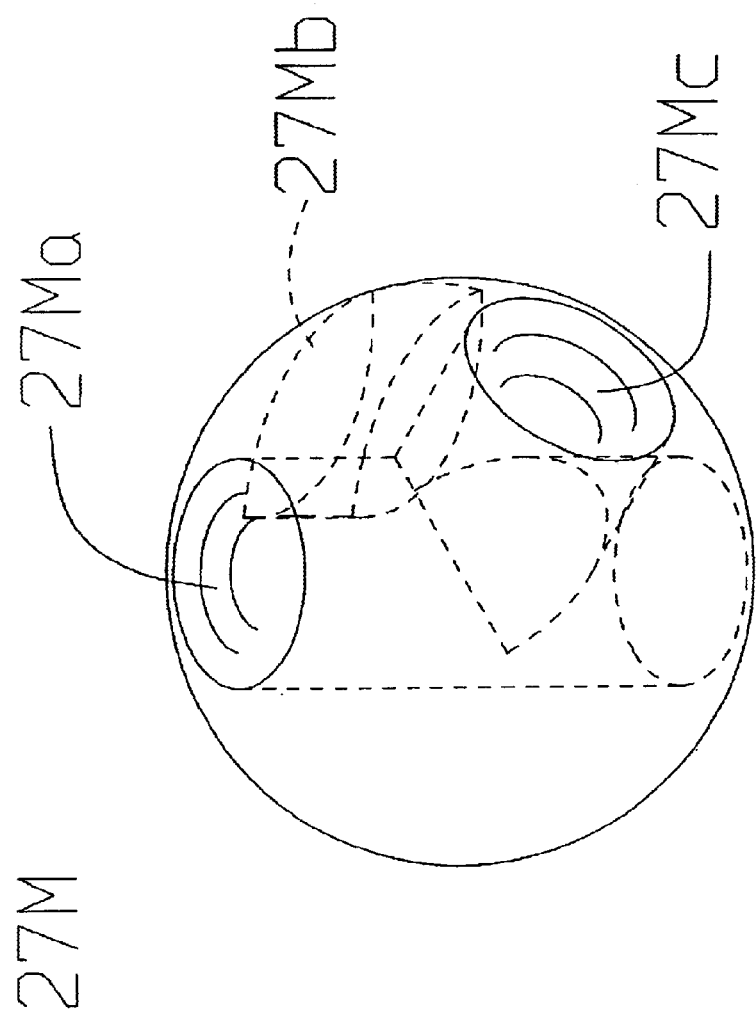
FIGS. 2d and 2e show modified ball valve members.

An example of "downloading" the pump, i.e., directly connecting the pump to the tank, is shown in FIG. 7 in which a bypass passageway BP1 is provided in the isolator valve assembly and the ball valves 27M" and 27M''' are of the type shown in FIG. 2d and are arranged so as to isolate the input ports of directional valve $D_v$ from pump 16 and tank 14 and directly couple pump 16 to tank 14 through passageway P3, bypass passageway BP1 and passageway P4. In this embodiment, the ball assemblies 27M and 27M' need not be the type shown in FIG. 2d and alternatively may be of the type shown in FIG. 2b, in view of the fact that no bypass passageway is provided between ball valve assemblies 27M and 27M'.

FIG. 8 shows a hydraulic circuit employing an isolator valve assembly which is designed to enable connecting (i.e., "floating") of the actuator ports together. In this embodiment, the isolator valve assembly is provided with a bypass passageway BP1 and having ball valves of the type shown in FIG. 2d and, when rotated to the positions shown in FIG. 8, the ball valves 27M and 27M' connect the ports 12a and 12b of actuator 12 directly together through passageways P1 and P2 and bypass passageway BP1, isolating the passageways P5 and P6, thereby enabling the actuator to "float" for test purposes, for example. The ports 12a and 12b may be re-coupled to the directional valve $D_v$ by rotating the ball valve assemblies 27M and 27M' to the position shown in FIG. 6b.

It should be noted that any combination of ports may be coupled to one another, the examples given in FIGS. 5 through 8 being merely exemplary and not exhaustive.

Still another advantage to the present invention can be realized from coupling more than one modular isolation valve assembly in a stack of modular components. For example, as shown in FIG. 8a, a sandwich-type isolator valve 20 is mounted upon a sub-plate SP. A sandwich-type module RV, which may be a relief valve, is mounted upon isolator valve assembly 20. A second isolator valve assembly 20' is mounted upon module RV thereby sandwiching the relief valve there between. A directional valve $D_v$ is shown mounted upon isolator valve assembly 20'. This arrangement allows selective replacement of the sandwich valves while obtaining the same safety and environmental protection which the invention provides for directional valves. FIG. 8b shows another arrangement wherein the valve 20 assembly in the stack of modules of the hydraulic circuit serves as the sub-plate, module RV being sandwiched between isolator valve assemblies 20 and 20'. Directional valve $D_v$ is stacked upon isolator valve assembly 20'.

Although the embodiment of FIG. 2 shows each ball valve assembly being provided with its own drive stem, alternative arrangements may be utilized in order to drive more than one ball valve assembly with a common drive stem. FIGS. 9a and 9b show perspective and elevational views of a drive assembly in which two balls 27 and 27' are driven by a single drive stem 29. As shown therein, ball 27' is directly driven by drive stem 29. Ball 27' is provided with an additional slot 27d' similar to the slot 27b provided for receiving projection 29a, as shown, for example, in FIGS. 3 through 4b. Ball 27 is driven by a coupling assembly comprised of a coupling body 34 having projections 34a and 34b at opposite ends thereof, which conform with the cross-sectional configuration of and are received in slots 27d' and 27b of balls 27' and 27, respectively. The coupling body 34 is mounted to rotate about its longitudinal axis and is provided with O-rings 35a, 35b to seal the passageway in which the coupling body 34 is mounted.

FIG. 10 shows still another arrangement in which four ball valves 27 through 27''' are driven by a single drive stem 29. Drive stem 29 directly drives ball 27'' through the rotation of drive stem 29, which rotation is imparted to ball 27'' through projection 29a and the cooperating slot 27b'' in ball 27''. Four coupling members 36, 38, 40 and 42 are arranged to be rotatably mounted within passageways (not shown) within the isolator assembly housing, each having a projection 36a through 42a extending into a cooperating slot 27e'' in ball 27'' and slots 27b''', 27b and 27b' in balls 27''', 27 and 27'. Each of the couplers 36 through 42 is provided with an O-ring 44 through 50 respectively to provide a liquid-tight seal for the passageways in which the coupling bodies are mounted. Each coupling member is provided with a bevel gear 36b through 42b, which bevel gears are in meshing engagement with two adjacent bevel gears arranged along diametrically opposed sides of each bevel gear. Thus, rotation of drive stem 29 is imparted to ball 27'' causing rotation of bevel gear 36b which rotates bevel gears 38b and 42b thereby rotating balls 27''' and 27'. Ball 27 is rotated by the meshing engagement of bevel gear 40b with bevel gears 36b and 42b.

If desired, the meshing gears 40b and 42b may be arranged so as to be displaced from meshing gears 36b and 38b to drive balls 27'' and 27''' with the drive stem 29 while providing another drive stem for either one of balls 27' or 27 enabling operation of balls 27' and 27 independently of balls 27'' and 27'''.

The arrangement of FIG. 10 may be further modified as shown in FIG. 10a by omitting the bevel gear 38 and operating ball 27'' with a drive stem of the type shown as 29 in FIG. 10. Similarly, coupling member 40 may be eliminated and ball 27 may be driven by a drive stem of the type shown as drive stem 29 in FIG. 10. Thus, various combinations are possible wherein four balls are driven by a single drive stem, one pair of balls are driven by a single drive stem and a second pair of balls are independently driven by a single drive stem, three balls may be driven by a single drive stem, and the fourth ball by an independent drive stem, and so forth.

FIG. 11 shows the sub-plate type of isolator valve assembly 20 fully assembled, two drive stems 29 and 29' being shown projecting from adjacent side walls, which side walls have ports 22a and 22b. Four pair of openings 24e, 24f, 24g and 24h are provided near the corners of the cover plate 24 and receive the bolts B as shown in FIG. 2 to secure the cover plate 24 to the housing 22. The openings 24a through 24d, which are clustered toward the center of cover plate 24, are arranged to be in direct alignment with similar openings in a directional valve, for example, or any other modular component to be stacked thereon and serving as one of the "sandwich" type modules in the stacked hydraulic system. The drive stems 29, 29' are conveniently located to provide ease of operation for rotating the ball valves. If desired, indicia may be provided at marginal portions of the side wall surrounding the drive stem and the drive stem may be provided with a "carat" for purposes of aligning the drive stem with the "open" and "closed" indicia provided along the side wall to assure proper positioning and orientation of the drive stems. The ports may be identified with indicia such as "To Pump," "To Tank," or the like. Stops STP1, STP1 cooperate with arms STP2, STP2 to prevent the ball valves from being turned beyond their end positions such as "open" and "closed".

The sequence of assembly of a modular stack is as follows:

In a conventional stack of sandwich-type modules, each module has four (4) aligned holes, including the valve assembly module although a greater or lesser number may be employed. With the modules in the stack arranged with their holes in alignment, elongated bolts are passed through the entire stack and are screwed into the sub-plate, thereby securing all of the sandwich-type modules together and further securing them to the sub-plate.

In a conventional stack, removing the directional valve requires the removal of the aforementioned four (4) bolts, thereby disassembling the entire stack. Nevertheless, the effectiveness of the valve assembly is not diminished so long as the stack is secured by the aforesaid four (4) bolts although a greater or lesser number may be provided.

In order to enable a directional valve to be removed while enabling the valve assembly to close the hydraulic circuits between the valve assembly and the directional valve, the isolator valve must be securely mounted to the sub-plate, holding together all of the sandwich-type modules arranged between the valve assembly and the sub-plate. In addition, the directional valve is bolted directly to the isolator valve to enable its removal for service and maintenance purposes, without disturbing the operation of the valve assembly module.

These objectives are accomplished in the present invention by securing the bottom half of housing 22 of the isolator valve assembly on the top of a sandwich module stack employing standard four (4) bolt locations, for example. The lid 24 of the isolator valve assembly is then bolted to the housing 22 with bolts that are inserted in holes 24e, as shown in FIG. 2, located at the four corners of the housing and away from the standard four-bolt location. The standard four-bolt tapped holes TH in the lid 24 are utilized for mounting the directional valve onto the lid through the employment of bolts of reduced length since these bolts need only be passed through the directional valve and into the tapped holes provided in lid 24. Thus, the isolator valve assemblies of the present invention may be utilized to perform the various tests and maintenance activities shown, for example, in FIGS. 5–8 as well as permitting removal of the directional valve by employing the bolt arrangement and assembly technique described above.

Another arrangement for mounting a sandwich type isolator valve assembly is shown in FIG. 15. The isolator valve assembly housing H is shown absent the valve assembly structure, for purposes of simplicity. Housing H is provided with a plurality of deep counter bores CB near each corner thereof, only one being shown in FIG. 15 for purposes of simplicity. Counter bore CB receives an elongated bolt B rigidly mounting the isolator valve housing to a subplate (not shown). The bolt B is obviously of a length sufficient to reach through other sandwich valves located under the isolator assembly housing H, should such sandwich type modules be placed between housing H and the subplate. The region above counter bore CB is a wider bore WB that is tapped along its interior surface to receive an insert I which is threaded along both its exterior and interior surfaces. The threads on the outer surface screw into the top of the wider bore WB after mounting and tightening of the bolt B. The interior threads of insert I receive a threaded mounting bolt (not shown) from a directional valve and/or other sandwich—type modules and/or isolator valve modules placed upon the isolator valve assembly housing H. The embodiment of FIG. 15 enables components mounted upon housing H to be removed without disassembling the entire stack and specifically without disturbing or disassembling the isolator valve assembly within housing H. Although not shown for purposes of simplicity, the housing H is considered to be comprised of either a solid block housing or one having a housing portion such as a housing portion 22 shown in FIG. 2b and a lid 24.

Obviously, any other type of bolt arrangement may be employed to provide the capability of isolating the directional valve from the pump and tank and the load device (actuator) and further permitting removal of the directional valve without disturbing the secure mounting of the directional valve assembly upon the stack.

FIG. 12 shows the assembled sub-plate type of isolator valve assembly shown in FIG. 11 and having a directional valve $D_v$ mounted thereon, it being understood that the openings in the directional valve, although not shown for purposes of simplicity, are arranged to be in alignment with the associated ports on the top surface of cover plate 24. It should be understood that two of the ports along the top surface of isolator valve 20 are coupled to the input sides of the directional valve and the remaining two ports are coupled to the output sides of the directional valve. The outlet ports on the top surface of cover plate 24 selectively couple the directional valve to the pump and tank through the associated inlet ports along the side walls thereof, for example, inlet ports 22a and 22b. Ports on the outlet side of the directional valve are coupled through the remaining two ports on the top surface of the cover plate 24 and are selectively coupled through appropriate passageways and ball valve assemblies to the remaining two ports on the side walls of the housing 20, not visible in FIG. 12, so as to be connected to a suitable actuator through piping (not shown for purposes of simplicity).

As was set forth herein and above, FIG. 13 shows a sub-plate $S_P$ having three (3) hydraulic circuits C1–C3 stacked thereon in side-by-side fashion. Sub-plate $S_P$ has a pair of ports $SP_t$ on end wall EW1 for respectively being coupled to a pump and a tank, not shown in FIG. 13 for purposes of simplicity. Three (3) pairs of ports $SP_t$ are provided along side wall SW1, each pair of ports being provided for coupling a load device associated with each stack through suitable piping. Each pair of ports is preferably aligned with the stacked hydraulic circuit arranged above each pair of ports. In the embodiment shown in FIG. 13, the ports along end wall EW1 couple to a pump and a tank, arranged to be common to all three stacked hydraulic circuits. The sub-plate $S_P$ of FIG. 13, in one preferred embodiment of the present invention, is fitted with a pair of ball valve assemblies each being arranged in one of the passageways (not shown for purposes of simplicity) respectively coupled to the ports provided at end wall EW1. The ball valve assemblies are preferably of the type shown in FIGS. 2, 2b, and 3 through 4b. This arrangement enables all three stacked hydraulic circuits to be isolated from the pump and/or tank through the use of one pair of ball valve assemblies. The drive stems 19 associated with each hydraulic circuit C1–C3 are preferably arranged below their associated circuits C1–C3.

As another alternative, the sub-plate of FIG. 13 may be provided with a bypass passageway of the type shown in FIG. 6a, for example, enabling the stacked hydraulic circuits C1 through C3 to be isolated from the pump and tank and further enabling the pump and tank to be directly connected.

As still a further embodiment, the common passageways coupled to the ports in end wall EW1 may be provided at spaced intervals therealong, and beneath each hydraulic circuit C1 through C3, a pair of ball valve assemblies leading to the pair of ports for each hydraulic circuit and enabling the selective isolation of one, more than one or all of the hydraulic circuits from the pump and valve.

The sub-plate of FIG. 13 may also be provided with ball valve assemblies for selectively isolating each hydraulic circuit from its associated load device in the manner shown, for example, by the ball valves 27 and 27', as shown in FIG. 5. As a further alternative, in addition to providing the capability of isolating each stacked hydraulic circuit C1 through C3 from its associated load device, such as the actuator 12, the sub-plate may be provided with a bypass passageway as shown at BP1 in FIG. 6a and further employing ball valves 27M of the type shown in FIG. 2d for directly coupling inputs and outputs of an actuator in addition to isolating the actuator from its hydraulic circuit.

Although FIG. 13 shows three (3) hydraulic circuits C1–C3 stacked on the sub-plate, it should be understood that a greater or lesser number of hydraulic circuits may be stacked upon a single sub-plate, depending upon the particular application.

Although the embodiment of FIG. 13 is described as having a single pair of ports for coupling a pump and a tank thereto, through suitable piping, it should be understood that two or more pairs of ports may be provided for coupling more than one set of pump and tank thereto, with appropriate passageways being provided between each of these pairs of ports and the hydraulic circuit being serviced by its associated pump and tank.

In addition to providing the sub-plate with ball valve assemblies for isolation of certain hydraulic devices, it should be understood that sandwich-type isolator valve assemblies may be incorporated as part of any of the hydraulic circuits stacked upon the sub-plate, depending only upon the particular application of the hydraulic circuit.

Figure 2E:
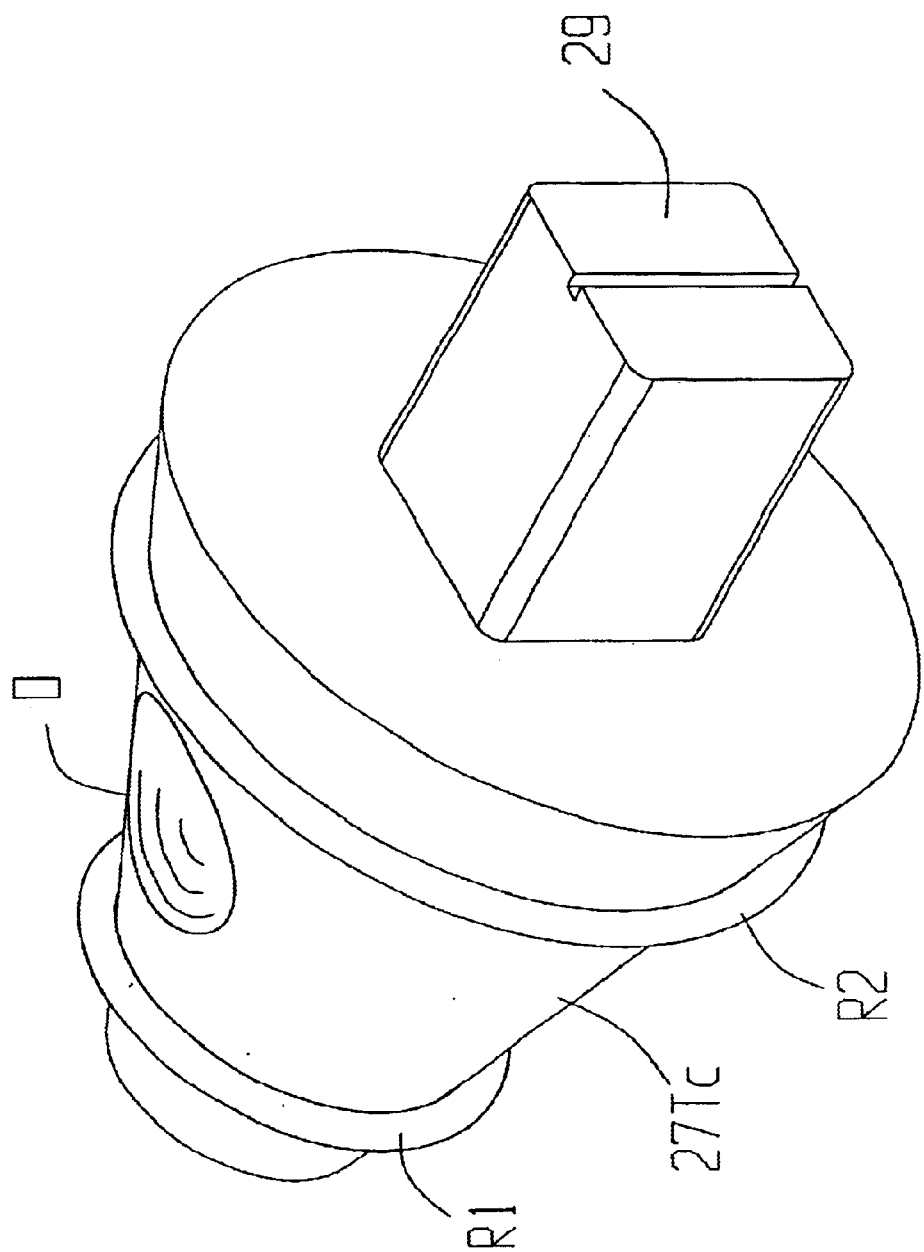

Although FIGS. 3–4b show a ball valve assembly, other shapes may be employed. For example, FIG. 2e shows a truncated, conical-shaped valve member $27_{TC}$ having a drive stem 29 which may either be directly connected to member $27_{TC}$ or by way of a projection and slot similar to projection 29a and slot 27b shown in FIGS. 4a and 4b. The ball valves may also be directly coupled to the drive stems, if desired.

The opening O may be aligned with passageways similar to those shown in FIG. 2 to complete a hydraulic circuit or rotated 90° to isolate and close a hydraulic circuit. O-rings R1, R2 provide a liquid seal.

The valve member $27_{TC}$ may also be cylindrical-shaped if desired. The valve member (conical or cylindrical) is placed within a chamber of conforming shape and cross-section.

As another alternative, the valve member may have a circular, rectangular, square or other polygonal cross-sectional shape as shown in FIGS. 2f, 2g and 2h. The valve member 27L is arranged to move in a linear fashion as shown by double-headed arrow A. When in the position shown in FIG. 2f, the openings O1 and O2 are displaced from passageways P1 and P2 in housing 22 and lid 24. When moved to the left, as shown in FIG. 2g, opening O1 is aligned with passageways P1 and P2 to open a hydraulic circuit. The valve member 27L may further be provided with an opening O2 arranged at a right-angle to opening O1 and when member 27L is moved to the right, opening O1 is displaced from passageways P1 and P2 while opening O2 is aligned with a bypass passageway BP1 similar to that shown in FIG. 6a to provide a similar function. The valve member may also be a relatively thin gate plate slidably mounted and functioning in a manner similar to the member 27L.

FIGS. 16a and 16b show cross sectional views of a sandwich type isolator valve assembly comprising a bottom housing 60, top housing 61 and intermediate housing 62. The intermediate housing 62 has a through-bore for receiving solid cylindrical-shaped spindle 63 having a drive stem 29' for rotation of spindle 63.

Cover plates CV1 and CV2 are placed at opposite ends of the housings, when assembled, cover plate CV2 having an opening for extending the drive stem 29' therethrough. Rotation of the spindle can be limited to a range of 90 degrees through the use of the limits described hereinabove and shown in FIG. 11.

Upper housing 61 has four passageways 61', 61", 61'", and 61"" which are diagonally aligned as shown. The four passageways terminate at their upper end at the upper surface of upper housing 61 at locations corresponding to a standard valve pattern such as the NFPA, ISO, and DIN standards as well as others. The passageways are machined at the lower ends so that they terminate to meet openings in the top surface of middle housing 62 lying on a single line parallel to the axis of rotation of dry stem 29'. Sealing washers 26', 26", 26'" and 26"" provide a liquid tight seal at the interface in regions of the aligned openings of the upper housing 61 and middle housing 63.

Lower housing 60 is provided with four passageways, 60', 60", 60'" and 60"" which, at their lower ends provide a standard valve pattern such as an NFPA, ISO, DIN or the like. The passageways terminate at their upper ends along a straight line parallel to the axis of rotation of drive stem 29', similar to the lower ends of the passageways provided in upper housing 61. Sealing washers 28', 28", 28'" and 28"" provide a liquid tight seal at the interfaces between the middle housing 62 and lower housing 60. Spindle 63 is provided with four through-bores 63a, 63b, 63c and 63d, which bores are aligned at one end with the passageways 61' through 61"" and likewise with the passageways 60' through 60"". Individual passageways are sealed from one another by the O-rings O1 through O4.

FIG. 16a shows a spindle position where all four ports are simultaneously sealed. By rotation of the drive stem 29' through a one-quarter turn (90 degrees) the openings 63a through 63d are aligned with the upper and lower passageways, as shown in FIG. 16b. These passageways cooperate with the directional valve $D_v$ in a manner similar to those previously described, the embodiments shown in FIGS. 16a and 16b simultaneously controlling the closing and opening of four (4) ports through the use of a cylindrical isolator valve operated by a single drive stem.

FIG. 17 shows the manner in which the isolator valve assembly of FIGS. 16a and 16b are mounted, which constitutes another alternative method of assembling a sandwich type isolator valve. Assembly steps include:

The housings 60, 61 and 62 are assembled on to a subplate or sandwich stack using bolts B1 and B1', the number of bolts being dictated by the particular standard applicable for the isolator valve assembly.

Adaptor plate 65 is placed on top of the isolator valve assembly and mounted thereto using bolt(s) B2. O-rings O1' through O4' shown in FIG. 16b provide a seal between the interface of the top housing 61 of the isolator valve assembly and the adaptor plate 65 which is provided with tapped holes H1 through H4 (only two of which are shown in FIG. 17) that are aligned with the mounting pattern of the sandwich stack and conform to the applicable standards, such as DIN, ISO and FPA and so forth, the tapped openings H1 through H4 in adaptor plate 65 being of a reduced diameter relative to the openings extending through upper housing 61 and a substantial portion of middle housing 62.

A directional valve $D_v$ or other sandwich type module is now mounted on the adapter plate 65 employing bolts B3, B3'. O-rings (not shown) similar to those placed in the interface between upper housing 61 and adaptor plate 65 are utilized in the region between the openings in directional valve $D_v$ and in the adaptor plate 65 and terminating at its upper edge thereof which interfaces with the openings in directional valve $D_v$. Adaptor plate 65 need not be utilized in applications where isolator valve assemblies of the type shown in FIGS. 16a through 17 are employed as a subplate.

What is claimed is:

1. An isolator assembly for hydraulic systems, comprising:

a housing having at least a first port and a second port;
a passageway in said housing for coupling said first and second ports;
a valve movably mounted in said passageway;
said valve having a passageway;
said valve being movable to a first position to align the valve passageway with the housing passageway to permit flow through the valve and housing passageways and said valve passageway being displaced from said housing passageway when the valve is moved to a second position to block flow through the housing passageway;
said first and second ports being on different surfaces of said housing; and
the surface having one of said ports having mounting means for mounting a hydraulic device to directly couple the said one of said ports to a port of a hydraulic device when the hydraulic device is mounted on said housing.

2. The isolator assembly of claim 1 wherein the surfaces having the first and second ports are transverse to one another to enable a drive stem for rotating said valve to freely operate without interference from a hydraulic device mounted upon the housing.

3. The isolator assembly of claim 1 wherein said outlet port is arranged along a top surface and said inlet port is arranged along a side surface, enabling stacking of at least one hydraulic device on said top surface.

4. The isolator assembly of claim 3 wherein the hydraulic device is a directional valve.

5. The isolator assembly of claim 1 wherein said outlet port and said inlet port are arranged along opposite parallel surfaces of said housing to enable said housing to be sandwiched between upper and lower components of a hydraulic system for selectively coupling hydraulic fluid to said upper and lower components through the isolator assembly.

6. The isolator valve assembly of claim 1 wherein the valve is a rotatably mounted ball valve.

7. The isolator valve assembly of claim 1 wherein the valve is a rotatably mounted conical-shaped valve.

8. The isolator valve assembly of claim 1 wherein the valve is a rotatably mounted cylindrical-shaped valve.

9. The isolator valve assembly of claim 1 wherein the valve is a linearly slidable valve member.

10. The isolator assembly of claim 1 further comprising:
a drive stem coupled to said valve;
said drive stem having a key projection extending into a key slot in said valve; and
said key slot having a shaped conforming to a shape of the key projection whereby rotation of the drive stem is directly imparted to the valve.

11. In combination, a hydraulic system and an isolator assembly for selectively isolating a hydraulic device in said hydraulic system, comprising;
said isolator assembly comprising a housing having a first set of two ports and a second set of two ports and passageways each coupling each one of the ports of the first set to an associated port of said second set;
two valve assemblies each being mounted in one of said passageways and each movable between a first position blocking flow in its associated passageway and a second position permitting flow therethrough between the ports coupled to its associated passageway;
each valve assembly being movable under control of a drive stem having an operating end extending outwardly from said housing to facilitate operation thereof,
said first set of ports being arranged along one surface of said housing and being aligned with associated ports along a surface of said hydraulic device to couple the ports of said isolator assembly housing with ports of the hydraulic device when said isolator assembly housing and said hydraulic device are joined together; and
said valve assemblies being selectively movable to isolate the hydraulic device.

12. The combination of claim 11 wherein the hydraulic system may remain in operation even when the hydraulic device is isolated by operation of said valve assemblies.

13. The combination of claim 11 wherein said hydraulic device is a directional valve.

14. The combination of claim 11 wherein said second set of ports are respectively coupled to a pump and a recovery tank.

15. The combination of claim 14 wherein said isolator assembly is provided with a third and fourth set of ports and a second set of passageways each coupling one of the ports of said third set to an associated port of said fourth set, said third set of ports being coupled to additional associated ports along the surface of said directional valve and said fourth set of ports being coupled to a second hydraulic device controlled by said directional valve.

16. The combination of claim 15 wherein said second hydraulic device is one of an actuator, and a motor.

17. The combination of claim 14 wherein the valve assemblies in the passageways of the isolator assembly couple the pump and tank to a directional valve and are movable to a position to couple the pump directly to the tank through a bypass passageway in said isolator assembly and to decouple the directional valve from said pump and tank.

18. The combination of claim 14 wherein valve assemblies in passageways of the isolator assembly coupling a directional valve to a second hydraulic device are movable to a position isolating the directional valve from the second hydraulic device and directly coupling the ports of the second hydraulic device.

19. The combination of claim 14 wherein valve assemblies in passageways of the isolator assembly coupling a directional valve to a second hydraulic device are movable to a position isolating the directional valve.

20. The combination of claim 11 wherein components of said hydraulic system are stackable one upon the other, said isolator assembly being at a bottom of a stack of said components.

21. The combination of claim 20 wherein said second set of ports are respectively coupled to a pump and a recovery tank.

22. The combination of claim 21 wherein the isolator assembly is provided with a third set of two ports coupled to a second set of two ports on said hydraulic device, a fourth set of two ports for coupling with a load device and a second set of passageways for communicating the second set of ports of said hydraulic device with said load device; and
ball valve assemblies being arranged in said second set of passageways in said isolator assembly for selectively opening and closing the associated passageways.

23. The combination of claim 11 wherein components of said hydraulic system are stackable one upon the other, said isolator assembly being at a position intermediate a top and bottom component of said stack.

24. The combination of claim 11 wherein said valve assemblies are ball valves driven by a single drive stem, said single drive stem driving one of said ball valves and a rotatably mounted coupling member arranged in said housing for coupling drive from the ball valve driven by the single drive stem to the remaining one of the ball valves being driven by the single drive stem.

25. The combination of claim 11 wherein said valve assemblies comprise ball valves driven by a single drive stem, said single stem driving one of said ball valves and coupling members each having one end coupled to their associated ball valves and opposite ends thereof being provided with bevel gears meshing with one another to impart drive from the ball valve driven by the single drive stem to the ball valve driven by the meshing bevel gears.

26. The combination of claim 11 wherein there are at least three valve assemblies each comprising a ball valve, said at least three ball valves being driven by a single common drive stem, said single drive stem driving one of said ball valves and coupling members each having one end coupled to rotate with rotation of their associated ball valves and opposite ends thereof being provided with bevel gears each meshing with at least one of the other bevel gears to impart drive from the ball valve driven by the single drive stem to the remaining ball valves.

27. The combination of claim 11 wherein there are at least three valve assemblies each comprising a ball valve, two of the ball valves being driven by a single drive stem, said single drive stem driving one of said at least two ball valves and coupling members each having one end coupled to their associated ball valves and opposite ends thereof being provided with bevel gears meshing with one another to impart drive from the ball valve driven by the single drive stem to the ball valve driven by the meshing bevel gears, the remaining ball valve being rotated by a second drive stem independently of said common drive stem.

28. A hydraulic circuit comprised of a plurality of modules, including a sub-plate and at least one hydraulic device;

said sub-plate having a first pair of ports for coupling with input/output devices, a second pair of ports for coupling with a load device, and third and fourth pairs of ports along a common surface of the module for coupling to associated pairs of ports along a common surface of a hydraulic device module mounted thereon and which provides a given function;

a first pair of passageways in said sub-plate module for communicating said first pair of ports with said third pair of ports; and a second pair of passageways in said sub-plate module for communicating said second pair of ports of said sub-plate module with said fourth pair of ports of said sub-plate module, thereby enabling communication of said first pair of ports with said second pair of ports to enable hydraulic fluid to flow between said first and said second pair of ports and through said hydraulic device; and a pair of rotatably mounted valves being arranged in said first pair of passageways for selectively closing said passageways when said valves are in a first position and for opening said first pair of passageways when rotated to a second position.

29. The hydraulic circuit of claim 28 wherein said sub-plate module is provided with a second pair of rotatably mounted valves being arranged in said second pair of passageways for selectively closing said passageways when said valves are in a first position and for opening said first pair of passageways when rotated to a second position.

30. The hydraulic circuit of claim 28 wherein hydraulic device is a directional valve.

31. The hydraulic circuit of claim 28 wherein the first and second pairs of ports are located on a surface of said sub-plate module which is not said common surface of said sub-plate module.

32. The hydraulic circuit of claim 28 wherein said valves each comprise:

a ball valve rotatably mounted in each of said passageways in said sub-plate and being rotatable about a first axis;

said ball valve having a passageway whose longitudinal axis is perpendicular to said first axis;

said ball valve passageway being rotatable to a first position to permit flow through the passageway in said housing and being displaced from said passageway in said housing when the ball valve is rotated to a second position to block flow through the passageway;

a drive stem rotatably mounted in said housing and having a first end extending outwardly from a first surface of said housing for rotating said drive stem;

said drive stem having a key projection extending into a key slot in said ball valve;

said key slot having a shape conforming to a shape of said key projection whereby rotation of said drive stem is directly imparted to the ball vale to move the ball valve between said first and second positions.

33. A hydraulic circuit comprised of a plurality of modules, including a sub-plate, an isolator assembly and at least one hydraulic device;

said sub-plate having a first pair of ports for coupling with input/output devices, a second pair of ports for coupling with a load device, and third and fourth pairs of ports along a common surface of the module for coupling to associated pairs of ports along a common surface of said isolator assembly module mounted thereon and which provides a given function;

a first pair of passageways in said sub-plate module for communicating said first pair of ports with said third pair of ports; and a second pair of passageways in said sub-plate module for communicating said second pair of ports of said sub-plate module with said fourth pair of ports of said sub-plate module thereby enabling communication between said first and second pair of ports in said isolator module to enable hydraulic fluid to flow through said hydraulic device; and said isolator valve module positioned between said sub-plate and said hydraulic device module and having first and second pairs of isolator valve ports arranged on a first common surface of the isolator valve module and respectively coupled to said third and fourth pairs of ports of said sub-plate module when mounted upon said sub-plate module, and third and fourth pairs of isolator valve ports coupled to associated first and second pairs of ports on said hydraulic device module when the hydraulic device module is mounted upon said isolator valve module;

said isolator valve module having a first pair of isolator valve passageways for communicating said third pair of ports of said sub-plate module with one of said first and second pairs of ports on said hydraulic device module and a second pair of passageways for communicating a fourth pair of ports of said sub-plate module with a remaining one of said first and second pairs of ports on the hydraulic device module whereby hydraulic fluid is communicated from said input/output devices to said load devices through said sub-plate, isolator valve and hydraulic device modules; and at least one of said pairs of isolator valve passageways each being provided with a rotatable valve assembly to block its associated isolator valve passageway when in a first position and to unblock its associated passageway when rotated to a second position.

34. The hydraulic circuit of claim 33 wherein said isolator valve module is provided with a second pair of rotatably mounted valves being arranged in one of said first pair of passageways for selectively closing said passageways when said valves are in a first position and for opening said first pair of passageways when rotated to a second position.

35. The hydraulic circuit of claim 33 wherein hydraulic device is a directional valve.

36. The hydraulic circuit of claim 33 wherein the first and second pairs of ports are located on a surface of said sub-plate module which is not said common surface of said sub-plate module.

37. The hydraulic circuit of claim 33 wherein said valves each comprise:

a ball valve rotatably mounted in each of said passageways in said isolator module and being rotatable about a first axis;

said ball valve having a passageway whose longitudinal axis is perpendicular to said first axis;

said ball valve passageway being rotatable to a first position to permit flow through the passageway in said housing and being displaced from said passageway in said housing when the ball valve is rotated to a second position to block flow through the passageway;

a drive stem rotatably mounted in said housing and having a first end extending outwardly from a first surface of said housing for rotating said drive stem;

said drive stem having a key projection extending into a key slot in said ball valve;

said key slot having a shape conforming to a shape of said key projection whereby rotation of said drive stem is directly imparted to the ball vale to move the ball valve between said first and second positions.

38. In combination, the plurality of hydraulic circuits, each circuit comprised of a plurality of modules and a sub-plate; and said sub-plate having a first pair of ports for coupling with input/output devices and a plurality of second pairs of ports arranged along a common surface of the sub-plate for coupling to associated pairs of ports of a module of each stack of hydraulic circuits mounted upon the sub-plate common surface and aligned with one of said second pair of ports associated therewith, said sub-plate being provided with passageways for communicating said first pair of ports with all of said second pairs of ports; and at least one ball valve assembly being arranged in one of said passageways and being rotatable between a first position enabling communication between that port of said first pair of ports and to a second position isolating the one of said first pair of ports from all of the hydraulic circuits stacked on said sub-plate.

39. In combination, the plurality of hydraulic circuits, each circuit comprised of a plurality of modules and a sub-plate;

said sub-plate having a first pair of ports for coupling with input/output devices and a plurality of second pairs of ports arranged along a common surface of the sub-plate for coupling to associated pairs of ports of a module of each stack of hydraulic circuits mounted upon the sub-plate common surface and aligned with one of said second pair of ports associated therewith, said sub-plate being provided with passageways for communicating said first pair of ports with all of said second pairs of ports; and ball valve assemblies each being arranged in one of said passageways and being rotatable between a first position enabling communication between that port of said first pair of ports and to a second position isolating said first pair of ports from all of the hydraulic circuits stacked on said sub-plate.

40. In combination, the plurality of hydraulic circuits, each circuit comprised of a plurality of modules and a sub-plate;

said sub-plate having a first pair of ports for coupling with input/output devices and a plurality of second pairs of ports arranged along a common surface of the sub-plate for coupling to associated pairs of ports of a module of each stack of hydraulic circuits mounted upon the sub-plate common surface and aligned with one of said second pair of ports associated therewith, said sub-plate being provided with passageways for communicating said first pair of ports with all of said second pairs of ports; and ball valve assemblies each being arranged in one of said passageways coupled to the pairs of ports of each hydraulic circuit each being selectively rotatable between a first position enabling communication between said first pair of ports and said second pairs of ports and to a second position isolating the said first pair of ports from the hydraulic circuits stacked on said sub-plate whose ball valve assemblies are closed.

41. In combination, the plurality of hydraulic circuits, each circuit comprised of a plurality of modules and a sub-plate;

said sub-plate having a first pair of ports for coupling with input/output devices and a plurality of second pairs of ports arranged along a common surface of the sub-plate for coupling to associated pairs of ports of a module of each stack of hydraulic circuits mounted upon the sub-plate common surface and aligned with one of said second pair of ports associated therewith, said sub-plate having passageways for communicating said first pair of ports with all of said second pairs of ports; and at least one valve means being arranged in one of said passageways and being rotatable between a first position enabling communication between that port of said first pair of ports and to a second position isolating the one of said first pair of ports from all of the hydraulic circuits stacked on said sub-plate.

42. A method for operating a hydraulic circuit comprised of a sub-plate and modules stacked upon the sub-plate, said hydraulic circuit having passageways communicating a pump and tank to a load device, one of said modules being an isolator valve assembly mounted between the sub-plate and another module and having rotatably mounted isolator valves in the passageways of said isolator module, movable between a first position opening its associated passageway in the isolator module and a second position closing its associated passageway, the method comprising:

moving selected ones of the isolator valves to the first position to isolate a module mounted on the isolator valve assembly module from said pump and tank.

43. The method of claim 42, further comprising:

moving remaining isolator valves to the first position to isolate the module mounted on the isolator valve assembly module from the load device.

44. A method for operating a hydraulic circuit comprised of a sub-plate and modules stacked upon the sub-plate, said hydraulic circuit having passageways communicating a pump and tank to a load device, one of said modules being an isolator valve assembly mounted between the sub-plate and another module and having rotatably mounted isolator valves in the passageways of said isolator module, movable between a first position opening its associated passageway in the isolator module and a second position closing its associated passageway, the method comprising:

moving selected ones of the isolator valves to the first position to isolate a module mounted on the isolator valve assembly from said load device.

45. The method of claim 44, further comprising:

moving remaining isolator valves to the first position to isolate the module mounted on the isolator valve assembly module from the pump and tank.

46. A method for operating a hydraulic circuit comprised of a sub-plate and modules stacked upon the sub-plate, said hydraulic circuit having passageways communicating a pump and tank to a load device, said sub-plate incorporating an isolator valve assembly having rotatably mounted isolator valves in the passageways of said sub-plate module, movable between a first position opening its associated passageway in the sub-plate module and a second position closing its associated passageway, the method comprising:

moving selected ones of the isolator valves to a first position to isolate a module mounted on the sub-plate from said pump and tank.

47. The method of claim 46, further comprising:
moving remaining isolator valves to the first position to isolate the module mounted on the isolator valve assembly module from the load device.

48. The method of claim 47, further comprising:
moving remaining isolator valves to the first position to isolate the module mounted on the isolator valve assembly module from the pump and tank.

49. A method for operating a hydraulic circuit comprised of a sub-plate and modules stacked upon the sub-plate, said hydraulic circuit having passageways communicating a pump and tank to a load device, said sub-plate incorporating an isolator valve assembly having rotatably mounted isolator valves in the passageways of said sub-plate module, movable between a first position opening its associated passageway in the sub-plate module and a second position closing its associated passageway, the method comprising:
moving selected ones of the isolator valves to a first position to isolate a module mounted on the sub-plate from said load device.

50. A method for operating a plurality of hydraulic circuits each comprised of a plurality of stacked modules arranged upon a common sub-plate, said sub-plate and said hydraulic circuit modules having passageways communicating a pump and tank to a load device, said sub-plate having a rotatably mounted isolator valve in one passageway of said sub-plate, movable between a first position opening its associated passageway and a second position closing its associated passageway, the method comprising:
moving the isolator valve to the first position to isolate the stacked hydraulic circuits mounted on the sub-plate from one of said pump and tank.

51. A method for operating a plurality of hydraulic circuits each comprised of a plurality of stacked modules arranged upon a common sub-plate, said sub-plate and said hydraulic circuit modules having passageways communicating a pump and tank to a load device, said sub-plate having a rotatably mounted isolator valves in each passageway of said sub-plate, movable between a first position opening its associated passageway and a second position closing its associated passageway, the method comprising:
moving the isolator valves to the first position to isolate the stacked hydraulic circuits mounted on the sub-plate from said pump and tank.

52. A method for assembling a hydraulic circuit formed of at least one sandwich-type module and including a sub-plate and at least one valve assembly module, and a directional valve, the valve assembly module having a housing and a cover lid, comprising:
a) placing the valve assembly module housing upon the sub-plate;
b) aligning bolt hole openings in said housing with associated tapped bolt hole openings in the sub-plate;
c) inserting a first set of threaded mounting bolts into the aligned openings in said valve assembly module housing sub-plate and tightening the first set of mounting bolts in the tapped openings in the sub-plate to secure the valve assembly module housing thereto;
d) providing tapped openings in an upper end of said housing;
e) providing a similar set of through openings in said cover lid;
f) placing the lid upon the housing so that the second set of openings in said lid are aligned with the tapped openings in the upper end of said valve assembly module housing;
g) inserting a second set of threaded bolts through the aligned openings and tightening the bolts to secure the cover lid to the housing;
h) providing a set of tapped openings in said cover lid;
i) aligning openings provided in said directional valve assembly module with said set of tapped openings in said cover lid; and
j) inserting a third set of threaded bolts through the aforesaid aligned openings in the directional valve assembly module and said cover lid and tightening the bolts to secure the directional valve to said lid.

53. The method of claim 52 further comprising placing an additional sandwich valve module between said directional valve and said valve assembly module including providing openings in said additional sandwich-type module for receiving the second set of bolts passing through said directional valve and threadedly engaging said lid to secure said additional module between said directional valve and said valve assembly.

54. The method of claim 52 further comprising placing an additional sandwich valve module between said sub-plate and said valve assembly module including providing openings in said additional sandwich-type module for receiving the first set of bolts passing through said valve assembly and threadedly engaging said sub-plate to secure said additional module between said directional valve and said valve assembly.

55. A method for assembling a hydraulic circuit including a sub-plate, at least one sandwich type module, an isolation valve assembly module and a device controlled by the hydraulic circuit, comprising:
a) providing tapped holes in said sub-plate;
b) providing through-holes in a housing of said valve assembly module, each through-hole having a lower counter bore at an upper end of each through-hole the lower counter bore having a diameter greater than its associated through-hole defining a shoulder between each lower counter bore and its associated through-hole and having an upper tapped counter bore above each lower counter bore having a diameter greater than the diameter of the lower counter bore to define a second shoulder;
c) placing the valve assembly upon the sub-plate so that through-holes in said housing are aligned with the tapped openings in said subplate;
d) inserting a first set of threaded fasteners into said upper and lower counter bores and through-holes and tightening said threaded fasteners in said sub-plate tapped openings so that heads of said threaded fasteners engage an associated one of said first shoulders and secure the housing to the sub-plate;
e) providing a plurality of hollow cylindrical inserts threaded on their interior and exterior surfaces;
f) tightening each insert in one of the tapped upper counter bores so that lower ends of the inserts engage an associated one of said second shoulders and secure the inserts in said housing;
g) placing the device on said housing so that openings in said device are aligned with threaded openings in said inserts; and
h) inserting a second set of threaded fasteners into the openings in said device and tightening each of the second set of threaded fasteners in an associated one of said inserts so that said second set of threaded fasteners each threadedly engage a tapped interior of an associated insert and secure the device to said housing.

* * * * *

UNITED STATES PATENT AND TRADEMARK OFFICE
CERTIFICATE OF CORRECTION

PATENT NO. : 6,871,576 B2  Page 1 of 4
APPLICATION NO. : 10/369400
DATED : March 29, 2005
INVENTOR(S) : Peter Vari It is certified that error appears in the above-identified patent and that said Letters Patent is hereby corrected as shown below:

IN THE DRAWINGS

On sheet 2, delete Figure 2 and insert the following:

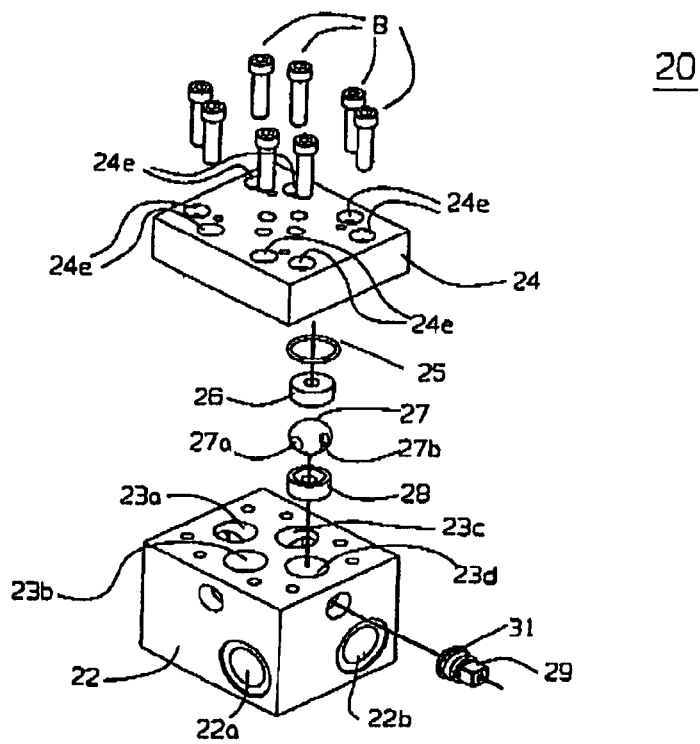

Fig. 2

UNITED STATES PATENT AND TRADEMARK OFFICE
CERTIFICATE OF CORRECTION

| | | |
|---|---|---|
| PATENT NO. | : 6,871,576 B2 | |
| APPLICATION NO. | : 10/369400 | |
| DATED | : March 29, 2005 | |
| INVENTOR(S) | : Peter Vari | |

It is certified that error appears in the above-identified patent and that said Letters Patent is hereby corrected as shown below:

IN THE DRAWINGS

On sheet 23, delete Figures 14 and 14a and insert the following:

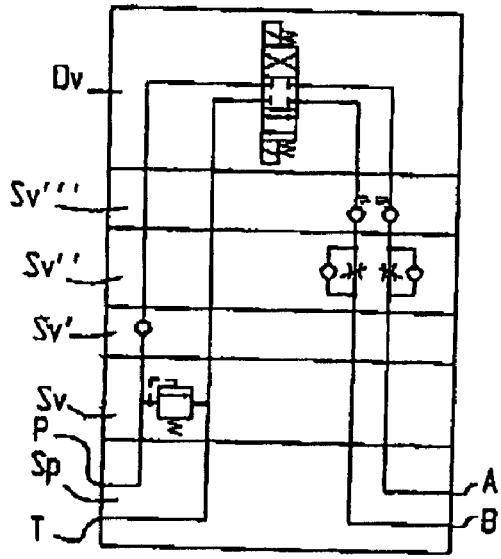

Fig. 14a
PRIOR ART

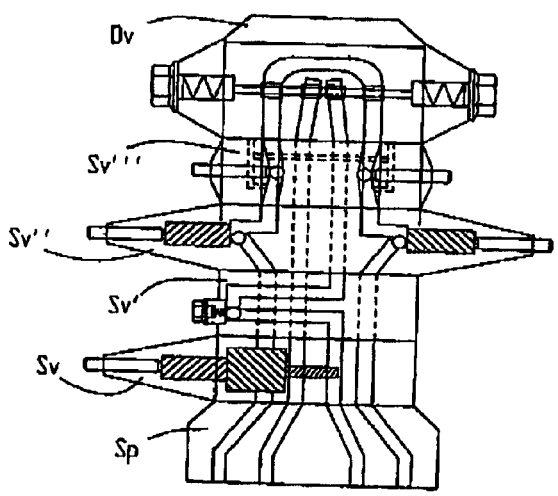

Fig. 14
PRIOR ART

UNITED STATES PATENT AND TRADEMARK OFFICE
CERTIFICATE OF CORRECTION

PATENT NO. : 6,871,576 B2  Page 3 of 4
APPLICATION NO. : 10/369400
DATED : March 29, 2005
INVENTOR(S) : Peter Vari It is certified that error appears in the above-identified patent and that said Letters Patent is hereby corrected as shown below:

IN THE DRAWINGS

On sheet 26, delete Figure 17 and insert the following:

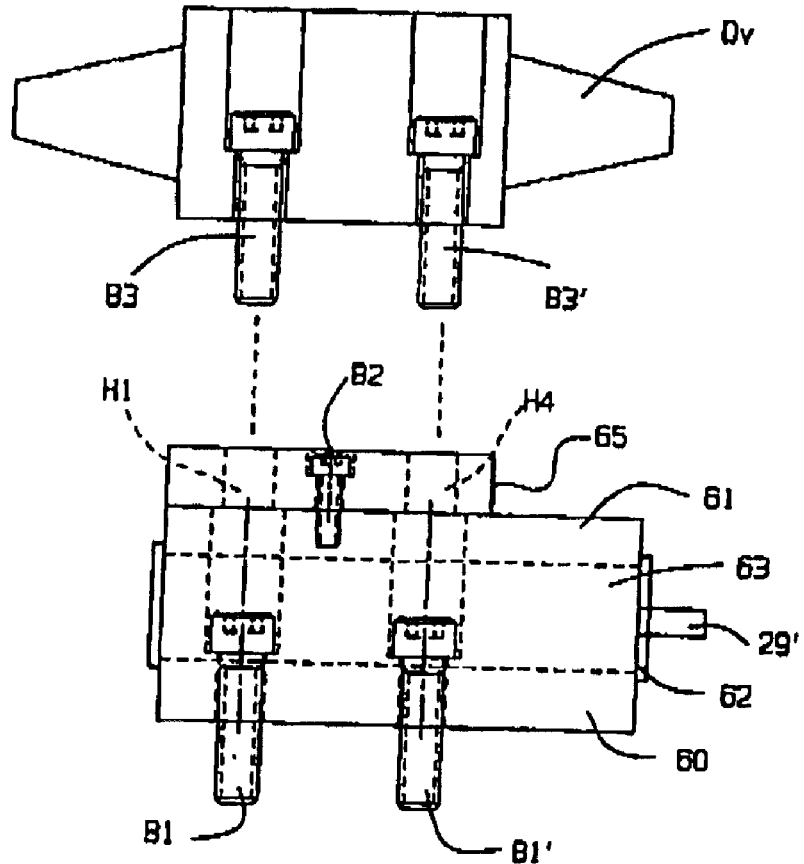

Fig. 17

UNITED STATES PATENT AND TRADEMARK OFFICE
CERTIFICATE OF CORRECTION

PATENT NO. : 6,871,576 B2
APPLICATION NO. : 10/369400
DATED : March 29, 2005
INVENTOR(S) : Peter Vari It is certified that error appears in the above-identified patent and that said Letters Patent is hereby corrected as shown below:

IN THE CLAIMS

In claim 10, column 13, line 31, after the first instance of the word "a", delete "shaped" and insert therefor --shape--.
In claim 16, column 14, line 8, after the word "actuator" delete ",".
In claim 32, column 16, line 3, after the first instance of the word "ball", delete "vale" and insert therefor --valve--.

Signed and Sealed this

Nineteenth Day of February, 2008

JON W. DUDAS
*Director of the United States Patent and Trademark Office*